(12) United States Patent
Ott et al.

(10) Patent No.: US 10,430,428 B2
(45) Date of Patent: Oct. 1, 2019

(54) SMART MAPPING

(71) Applicant: Experian Health, Inc., Franklin, TN (US)

(72) Inventors: William Reed Ott, Goodlettsville, TN (US); Jason Harrison Wallis, Spring Hill, TN (US); Derek Neil Davis, Smyrna, TN (US)

(73) Assignee: EXPERIAN HEALTH, INC., Franklin, TN (US)

( * ) Notice: Subject to any disclaimer, the term of this patent is extended or adjusted under 35 U.S.C. 154(b) by 511 days.

(21) Appl. No.: 15/086,253

(22) Filed: Mar. 31, 2016

(65) Prior Publication Data

US 2017/0286495 A1 Oct. 5, 2017

(51) Int. Cl.
| | | |
|---|---|---|
| *G06F 16/00* | (2019.01) | |
| *G06F 16/2458* | (2019.01) | |
| *G06F 16/22* | (2019.01) | |
| *G06F 16/2457* | (2019.01) | |

(52) U.S. Cl.
CPC .......... *G06F 16/2462* (2019.01); *G06F 16/22* (2019.01); *G06F 16/24578* (2019.01)

(58) Field of Classification Search
CPC .......... G06F 17/30312; G06F 17/3053; G06F 17/30536; G06F 17/30507
USPC .......................................................... 707/749
See application file for complete search history.

(56) References Cited

U.S. PATENT DOCUMENTS

| | | | | |
|---|---|---|---|---|
| 6,968,348 | B1* | 11/2005 | Carone | G06Q 40/02 707/696 |
| 8,122,061 | B1* | 2/2012 | Guinness | G06F 17/30292 706/11 |
| 8,286,085 | B1* | 10/2012 | Denise | G06Q 10/107 715/752 |
| 8,577,849 | B2* | 11/2013 | Yakout | G06F 17/30303 707/690 |
| 9,946,699 | B1* | 4/2018 | Dye | G06F 17/243 |
| 9,953,047 | B2* | 4/2018 | Lambert | H04W 4/029 |
| 10,102,259 | B2* | 10/2018 | Agrawal | G06F 17/30551 |
| 2003/0063072 | A1* | 4/2003 | Brandenberg | G06F 1/1613 345/173 |
| 2008/0126335 | A1* | 5/2008 | Gandhi | G06F 17/30622 |
| 2012/0226889 | A1* | 9/2012 | Merriman | G06F 17/30333 711/216 |
| 2012/0302268 | A1* | 11/2012 | Casto | H04W 4/08 455/466 |

(Continued)

*Primary Examiner* — Vincent F Boccio
(74) *Attorney, Agent, or Firm* — Merchant & Gould

(57) ABSTRACT

Smart mapping is provided. A smart mapping system (SMS) and method identify an information source (IS) as an intended recipient of an information request item by matching one or more data elements in a dataset associated with an information request (IR) item with an IS candidate stored in a mapping database. An IS candidate may be an exact match, or a partial match with a highest match agreement score. The SMS provides for notifying an information requestor in real time or near real time when a match is determined or when a plurality of matching IS candidates are identified, such that a user is enabled to select an intended IS, or provide additional input. When a trend associated with matching particular data items to a particular IS candidate is identified, the SMS may add mapping property values to the mapping database for refining and improving the system.

20 Claims, 9 Drawing Sheets

(56) References Cited

U.S. PATENT DOCUMENTS

| | | | | |
|---|---|---|---|---|
| 2013/0288647 | A1* | 10/2013 | Turgeman | H04W 12/06 |
| | | | | 455/411 |
| 2014/0040274 | A1* | 2/2014 | Aravamudan | G06F 17/30386 |
| | | | | 707/741 |
| 2015/0026153 | A1* | 1/2015 | Gupta | G06F 17/30336 |
| | | | | 707/711 |
| 2015/0363449 | A1* | 12/2015 | Lambert | H04W 4/029 |
| | | | | 707/743 |
| 2016/0171027 | A1* | 6/2016 | Agrawal | G06F 17/30949 |
| | | | | 707/743 |
| 2017/0147650 | A1* | 5/2017 | Hattori | G06F 17/30507 |

* cited by examiner

Fig. 4

Doe, John
ACCT #: 0010002003004-1234
MRN: 987654321abc
Birth 01/01/1900
Service 01/01/2020

Status: Done
Comments

OVERVIEW | DEMOGRAPHICS | COVERAGE | PRE-CERTIFICATION | CHARITY | ESTIMATE | TRIAGE | COLLECTION | PT PORTAL

PREV | NEXT

COVERAGE

☑ Step 1: Enter Payer Information

☒ InsureU
User ID: X1Y2Z3
Group ID: 1357
Primary ▼

☒ ABC
User ID: 1234ZYX
Group ID: 2468
Secondary ▼   _402_

Add another payer

Payer ABC is not valid
Did you mean: ABC Georgia?   _404_
[Yes - update] [No - revise payer info] [Other options]

☑ Step 2: Verify Patient Information

Verify with patient that the information below is correct before continuing

First Name: John          Address: 123 Oak St.
Last Name: Doe            City: Anytown
SSN: 123-45-6789          State: FL
DOB: 01/01/1900           ZIP: 33111

[Correct]   [Make Changes]   [Skip]

[Submit]

400

SMART MAPPING

BACKGROUND

In an effort to reduce insurance claim rejections and to increase collections, many healthcare providers perform various checks and verifications of patient information during a registration process or prior to providing healthcare services to the patient. For example, a verification that healthcare providers typically implement is an insurance eligibility and benefits verification, where a patient's insurance coverage and benefits are verified by an information source, such as a payer (e.g., insurance companies, federal and state health plans, etc.) or a clearinghouse.

Healthcare industry standards have been implemented for enabling healthcare providers (optionally via an intermediary system) to submit an electronic inquiry to verify a patient's insurance coverage and benefits with a specified payer and to receive an electronic response comprising information about whether the patient is covered by the payer, and if so, details about the patient's insurance coverage. To check the patient's eligibility, a healthcare provider registrar typically inputs basic information about the patient, the patient's insurance policy information (e.g., the insurance company name, the patient's policy number, etc.), and the type of medical service(s) the patient is to receive.

Due to a variety of factors, oftentimes the information entered by the registrar is inaccurate or does not properly or positively identify a payer. For example, a registrar may not include a state associated with a patient's insurance policy or may not select a correct payer from a list of payers. Additionally, various healthcare providers may use different nomenclatures to identify a payer. Accordingly, a payer to which the eligibility transaction request should be routed may not be correctly identified, and the healthcare provider may not receive the eligibility information needed for a patient. For example, the healthcare provider may receive notice that the patient does not have insurance benefits, although the patient is eligible for coverage. Consequently, transaction data may have to be manually re-keyed, and another eligibility transaction request may have to be submitted. As can be appreciated, this can increase network traffic, and can be both time-consuming and inefficient.

It is with respect to these and other considerations that the present invention has been made.

BRIEF SUMMARY

Smart mapping is provided. Various aspects of a smart mapping system identify an information source as an intended recipient of an information request item by matching one or more data elements in a dataset associated with an information request item with an information source candidate stored in a mapping database.

In some examples, an information source candidate is determined as the intended recipient of an information request item when one or more data elements in the dataset are an exact match with one or more mapping properties of the information source candidate. In other examples, an information source candidate is determined as the intended recipient of an information request item when one or more data elements in the dataset partially match one or more mapping properties of the information source candidate. When a plurality of partially matching information source candidates is identified, an intended recipient is determined based at least in part on a match agreement score. In other examples, when information source data elements provided in a dataset are not sufficient for identifying an information source candidate, the smart mapping system determines a probable location or state from various pieces of information for determining an information source candidate.

In some examples, the smart mapping system notifies an information requestor in real time or near real time when a match is determined. When a plurality of matching information source candidates are identified, a notification may be provided to the information requestor such that a user is enabled to select an intended information source, or provide additional input for determining the intended information source of the information request item.

The smart mapping system maps the identified intended information source to an associated standard identifier, adds the standard identifier to the information request item, and transmits the information request item to a downstream processing system. The standard identifier enables downstream processing system to accurately identify the intended information source and transmit the information request item to the intended information source system.

In some examples, the smart mapping system receives an information response item from the determined information source, and determines, stores, and analyzes the accuracy of the match identified by the smart mapping system. When a trend associated with matching particular data items to a particular information source candidate is identified, the smart mapping system may add mapping property values to the mapping database for refining and improving the system.

BRIEF DESCRIPTION OF THE DRAWINGS

Further features, aspects, and advantages of the invention represented by the examples described in the present disclosure will become better understood by reference to the following detailed description, appended claims, and accompanying Figures, wherein elements are not to scale so as to more clearly show the details, wherein like reference numbers indicate like elements throughout the several views, and wherein:

FIG. 4 illustrates one example of a user interface;

DETAILED DESCRIPTION

A smart mapping system is described herein and illustrated in the accompanying figures. The smart mapping system includes functionality for identifying an information source from information in a received information request item, wherein the information source is an intended recipient of the information request item.

Figure 1:
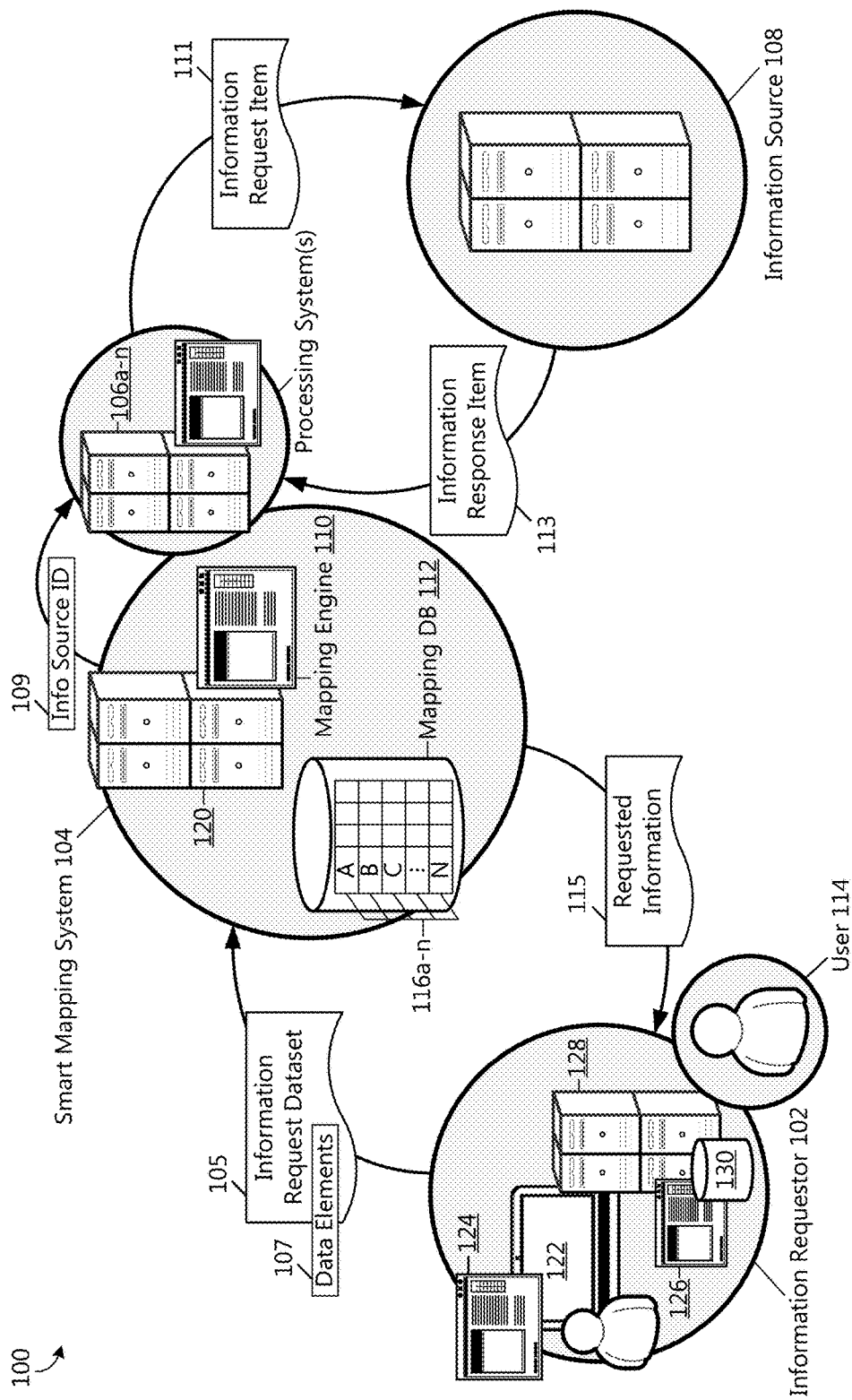
FIG. 1 illustrates one example of the smart mapping system.

FIG. 1 illustrates one example of the smart mapping system 104 in a suitable operating environment 100.

Although some examples will herein be described in a healthcare environment, aspects are not limited to healthcare systems, and can be implemented in various environments. In some examples, the smart mapping system 104 is maintained and operated by an intermediary service provider that acts as an interface between information requestors 102 and information sources 108. For example, an intermediary service provider may act as an interface to normalize communication solutions, data requirements, and transaction formats.

According to an example, in a healthcare system operating environment, the information requestor 102 may be a healthcare provider (e.g., a physician, hospital, etc.), the information source 108 may be a payer (e.g., insurance company, federal health plan, state health plan, etc.), and the intermediary service provider functions as a HIPAA (Health Insurance Portability and Accountability Act) clearinghouse system that converts non-standard transactions (e.g., human-readable format) into standard HIPAA-compliant transactions or standard transactions into non-standard transactions.

As illustrated, the smart mapping system 104 includes a mapping engine 110 running on computing device 120. The functionality of the smart mapping system 104 may be distributed among multiple computing devices or consolidated in a single computing device. The mapping engine 110 is operative to receive one or more information request datasets 105 from the information requestor 102, wherein an information request dataset 105 includes a plurality of data elements 107, and is associated with an information request item 111.

According to examples, an information request item 111 is a request for information from an information source 108. For example, the request for information may be a request for eligibility and benefits information associated with a user 114 (e.g., user of healthcare services). According to this example, the information request dataset 105 may be associated with an eligibility and benefits inquiry (information request item 111) directed to a payer (information source 108) from a healthcare provider (information requestor 102) to verify a patient's (user's 114) coverage and to determine other information, such as the patient's co-pay, co-insurance, and deductible amounts. The plurality of data elements 107 may include various pieces of information, such as information about the information source 108 (e.g., payer name), information about the information requestor 102 (e.g., healthcare provider name, healthcare provider identifier, healthcare provider type, city and state of the healthcare provider, place of treatment, etc.), and information about the subject of the information request (e.g., patient identifier, patient name, group number, etc.). In some examples, a data element 107 identifying an information source 108 is a text-based value, and may be complete, partially complete, or incomplete. According to an aspect, the data items are input into a user agent 124 (e.g., patient registration application) running on client device 122 (e.g., general computing device, mobile computing device, etc.), and are communicated to the smart mapping system 104, for example, via an electronic data interchange (EDI) transaction, web service, web form, or web page.

As illustrated in FIG. 1, the information requestor 102 may maintain an information system 126 running on a computing device 128. The information system 126 includes a database 130 for storing business and user information (e.g., patient/client information) used by the information requestor 102. For example, in a healthcare system operating environment, the database 130 may store such information as patient contact information, patient demographic information, insurance information, electronic medical records, billing information, and appointments.

The mapping engine 110 is operative to receive an information request dataset 105 associated with an information request item 111 from an information requestor 102, and identify an intended recipient (i.e., information source 108) of the information request item 111. According to an example, the mapping engine 110 is operative to identify the intended recipient by finding a match between one or more data elements 107 in the information request dataset 105 and an information source candidate 116a-n (collectively, 116) stored in a mapping database 112. According to an aspect, each information source candidate 116 stored in the mapping database 112 is representative of an information source 108, and is associated with an information source identifier (ID) 109. In some examples, the mapping database 112 comprises a mapping table including a plurality of information source candidates 116, known variants of the plurality of information source candidates 116, various properties associated with each of the plurality of information source candidates 116, and the information source ID 109 associated with each of the plurality of information source candidates 116.

Upon receiving an information request dataset 105 associated with an information request item 111, the mapping engine 110 is operative to compare the one or more data elements 107 in the received information request dataset 105 to information source candidates 116 in the mapping database 112. According to an aspect, the mapping engine 110 executes a deterministic matching function for determining an exact match between the one or more data elements 107 and an information source candidate 116. If an exact match is found, the mapping engine 110 is operative to make a determination that the information source 108 associated with the matching information source candidate 116 is the intended recipient of the information request item 111.

If an exact match is not found, the mapping engine 110 is operative to execute a probabilistic matching function for determining one or more probable matches between the one or more data elements 107 in the received information request dataset 105 and one or more information source candidates 116 based on a match agreement score. If more than one information source candidate 116 is identified as a probable match, the mapping engine 110 is further operative to determine a best matching information source candidate 116, and determine that the information source 108 associated with the best matching information source candidate 116 is the intended recipient of the information request item 111.

Upon determining an intended recipient (i.e., information source 108) of the information request item 111, the mapping engine 110 is further operative to apply the information source ID 109 associated with the information source 108 to the information request item 111, and transmit the information request item 111 to one or more downstream processing systems 106A-N (collectively, 106). For example, in a healthcare system operating environment, a downstream processing system 106 may include an insurance eligibility verification system, a demographic information verification system, an order checking system, a financial clearance system, or a claim submission system.

According to an aspect, utilization of an information source ID 109 enables the one or more downstream processing systems 106 to reliably, consistently, and accurately identify and transmit information request items 111 to the intended information sources 108. Additionally, and as will be described in further detail below, by standardizing multiple clients' (i.e., information requestors' 102) naming policies, the mapping system 104 is enabled to utilize less memory to process received information request dataset 105.

Consider, for example, that various information requestors 102 use different naming policies to identify an information source 108 associated with an information request item 111. Without the smart mapping system 104, a processing system 106 may not be able to accurately and reliably identify the intended information source 108, or may require additional processing steps to determine the intended information source 108. Accordingly, the information request item 111 may be returned to the information requestor 102 (or intermediary system), and manual intervention by an administrative user or registrar or additional processing may be required. As can be appreciated, reliable, consistent, and accurate identification of an indented information source 108 associated with an information request item 111 reduces the likelihood of submitting incorrect or incomplete information request items 111, thus reducing a number of unnecessary transmissions and reducing an amount of network traffic.

The one or more processing systems 106 are operative to submit an information request item 111 to the identified information source 108 represented by the information source ID 109. According to one example, the processing system 106 is an insurance eligibility verification system, and includes functionality to translate data elements 107 in the information request dataset 105 into a standard HIPAA-compliant transaction (e.g., using an EDI code set), such as an X12 270 healthcare eligibility benefit inquiry transaction. The processing system 106 is further operative to receive an information response item 113 from the information source 108 in response to the information request item 111. According to an aspect, the processing system 106 includes functionality to interpret the information response item 113 (e.g., from an EDI code set to a human-readable format), and pass the requested information 115 (e.g., insurance eligibility verification information, demographic information verification information, order information, financial clearance information, or a claims information) to the smart mapping system 104, or directly to the information requestor 102.

In some examples, an information response item 113 may indicate that the user 114 associated with the information request item 111 cannot be verified. This may be due to various reasons, for example, the user 114 does not have an account with the information source 108 (e.g., the user 114 never had or is no longer covered under a benefits plan with the information source), the intended information source 108 was incorrectly identified (e.g., the information request item 111 was sent to the wrong information source 108), the user 114 was not correctly identified in the information request item 111 (e.g., incorrect user or patient ID), invalid, missing, or incorrect user information was received in the information request dataset 105 (e.g., misspelled name, wrong birthdate, wrong social security number), and the like.

In some examples, the smart mapping system 104 is further operative to record a history of matches made and calculated match agreement scores, receive and store an indication of whether a match was an accurate match or an inaccurate match, and monitor trends for improving and refining the system. In some examples, if an information response item 113 indicates that the identified information source 108 for an information request item 111 is incorrect (e.g., the user 114 associated with the information request item 111 cannot be verified), the mapping engine 110 is operative to determine a next best matching information source candidate 116 as the intended information source 108 recipient, apply the information source ID 109 associated with the information source 108 to the information request item 111, and transmit the information request item 111 to the one or more downstream processing systems 106 for transmission of the information request item(s) 111 to the intended information source 108.

According to one example, the smart mapping system 104 is operative to provide real-time or near real-time feedback to the information requestor 102. For example, when an administrative user inputs information request data elements 107 into the information requestor user agent 124, the user agent 124 may automatically transmit the input data (i.e., information request dataset 105) to the smart mapping system 104, such that the smart mapping system 104 can identify an information source 108 as an exact match or a best probable match or one or more information sources 108 as one or more probable matches between the one or more data elements 107 in the information request dataset 105 and one or more information source candidates 116, and transmit the identified information source(s) 108 to the user agent 124 in real-time or near real-time.

According to one example, a notification of an identified exact matching information source 108 is presented to the administrative user as a verified information source 108. According to another example, a plurality of probable matching information sources 108 are presented to the administrative user as suggestions from which the administrative user can select the intended information source 108. According to another example, a best probable matching information source 108 is presented to the administrative user as a best guess suggestion, which the administrative user is able to either accept or reject and reenter one or more data elements 107. Alternatively, if an exact match or probable match is not found, or if a probable match has a match agreement score that is below a predetermined threshold, the mapping engine 104 is operative to transmit a notification to the user agent 124, such that the administrative user is enabled to correct or reenter one or more data elements 107. According to an aspect, by matching and identifying an information source 108 in real-time or near real-time and by providing feedback to the administrative user, incorrect and incomplete information request items 111 and information request items 111 transmitted to an incorrect information source 108 can be reduced or eliminated, thus reducing additional processing and network traffic.

The smart mapping system 104, the information requestor 102, the processing system(s) 106, and the information source 108 communicate over a computer network, such as the Internet. According to an aspect, the smart mapping system 104 uses a combination of electronic data interchange (EDI) transactions, web services, web forms, and web pages to interactively communicate with the information requestor 102, the processing system(s) 106, and the information source 108. Communications (i.e., messages) may be encrypted or otherwise secured at or above the level required to comply with applicable health care information privacy laws, regulations, and standards. The terms "request" and "response" may be used to generally describe message directionality and should not be construed as requiring any particular communication method or protocol.

EDI transactions are based on a standardized interface using strictly formatted messages representing documents that allows the information requestor 102, the processing system(s) 106, and the information source 108 to exchange and understand information with little to no human intervention. Human intervention in the processing of a received message is typically limited to dealing with error conditions, quality review, and other special situations. Examples of a suitable EDI health care transaction formats include, but are not limited to, HL7, 278, and X12.

Web service transactions are through an interface described in a computer readable format such as the Web Service Definition Language (WSDL) that defines the access point(s), method(s), and other specifications of the web service. The web service uses protocols such as, but not limited to, the Simple Object Access Protocol (SOAP) for communication. The messages sent and received by the web service contain the actions and corresponding information specified in the web service definition. The messages are written using data formats such as, but not limited to, the Extensible Markup Language (XML) and the Security Assertion Markup Language (SAML). The messages are typically sent over the Internet using transport protocols such as, but not limited to, the Hypertext Transfer Protocol (HTTP), the Hypertext Transfer Protocol Secure (HTTPS), or the Simple Mail Transfer Protocol (SMTP). The web service may be a Representational State Transfer (REST) compliant service with a uniform set of methods or an arbitrary service with an arbitrary set of methods.

The smart mapping system 104 may be a module or component of a larger health care information system or health care management suite offered by the intermediary service provider providing functionality including, but not limited to, any or all of patient intake, patient record maintenance, insurance eligibility verification, demographic information verification, order checking, financial clearance, and claim submission. While user interactions may be described as if directly handled by the smart mapping system 104, it should be appreciated that the user interactions may actually be handled by one or more other components of the larger system at different times and the information from those user interactions are made available to the smart mapping system 104.

Figure 2:
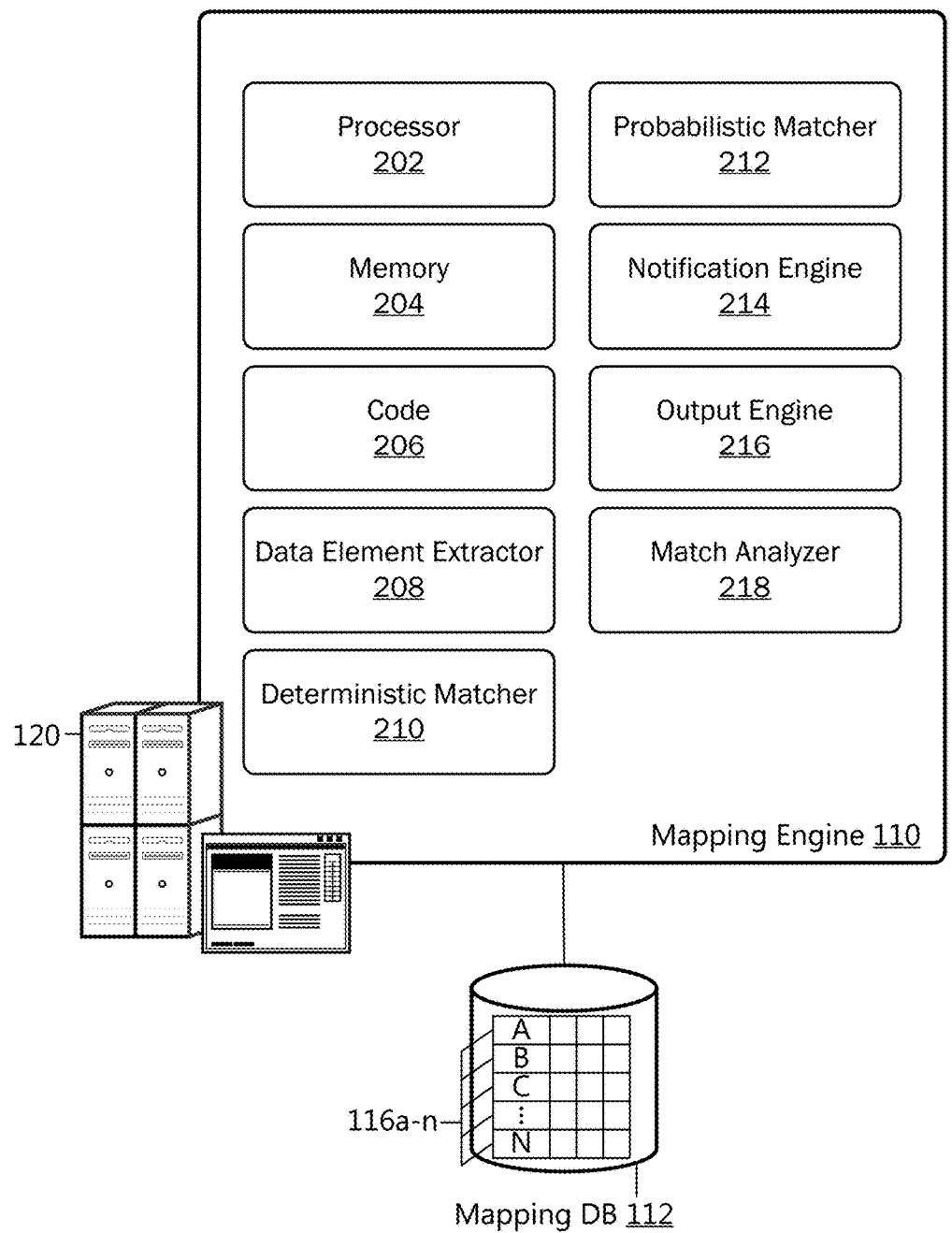
FIG. 2 illustrates one example of various components of the smart mapping engine.

FIG. 2 is a block diagram illustrating an example of components of the mapping engine 110. According to examples, the mapping engine 110 includes at least one processor 202, at least one memory 204 coupled to the at least one processor 202, and code 206 which is executable by the processor 202 to cause: a data element extractor 208 to receive an information request dataset 105, and extract data elements 107 from the received information request dataset 105; a deterministic matcher 210 to determine an exact match between the one or more extracted data elements 107 and an information source candidate 116 stored in the mapping database 112; a probabilistic matcher 212 to determine one or more probable matches between the one or more extracted data elements 107 and one or more information source candidates 116 stored in the mapping database 112; a notification engine 214 to notify an administrative user of a determined match; an output engine 216 to transmit an information request item 111 to one or more downstream processing systems 106A-N; and a match analyzer 218 to record a history of matches made and calculated match agreement scores, determine whether a match was an accurate match or an inaccurate match, and monitor trends for improving and refining the system.

The data element extractor 208 is illustrative of a software module, system, or device operative to receive one or more information request datasets 105 from an information requestor 102, wherein an information request dataset 105 is associated with an information request item 111 directed to an information source 108. According to one example, the information request item 111 is a request for information associated with verification of a user's 114 insurance eligibility and benefits.

Figure 3A:
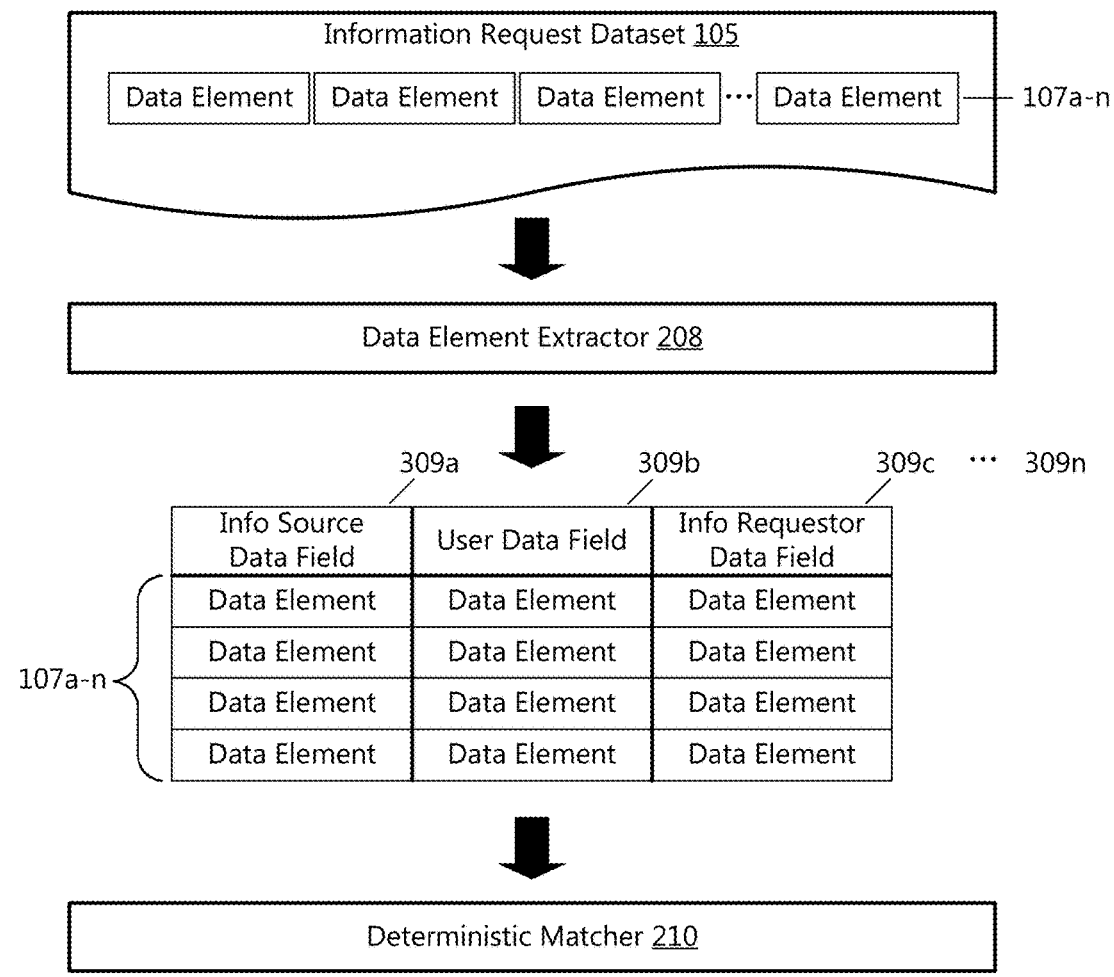
FIG. 3A illustrates example data fields into which data elements in an information request dataset can be extracted and parsed.

The data element extractor 208 is further operative to extract one or more data elements 107a-n (collectively, 107) from the received information request dataset 105, and parse the one or more data elements 107 into separate data element fields 309a-n (collectively, 309) that can be matched with information source candidate 116 information stored in the mapping database 112. According to one example and as illustrated in FIG. 3A, the one or more data elements 107 include information source 108 data, user 114 data, and information requestor 102 data that can be extracted and parsed into an information source data field 309a, a user data field 309b, and an information requestor data field 309c. According to examples, information source 108 data is text-based, and may be complete, partially complete, or incomplete.

According to an example, data elements 107 that may be included in and extracted from an information request dataset 105, and parsed into an information source data field 309a may include one or more information source 108 data elements, such as: a name of the information source 108 to which the information request item 111 is directed, an abbreviation of the information source 108, a mnemonic of the information source 108, and a description of the information source 108.

According to another example, data elements 107 that may be included in and extracted from an information request dataset 105, and parsed into a user data field 309b may include one or more user 114 data elements, such as: a user 114 name, an identifier associated with the user 114, one or more identifiers associated with the user's relation with the information source 108 (e.g., member ID, group number, policy number).

According to another example, data elements 107 that may be included in and extracted from an information request dataset 105, and parsed into an information requestor data field 309c may include one or more information requestor 102 data elements, such as: a name of the information requestor 102, an identifier associated with the information requestor 102, an address or other location information associated with the information requestor 102, and a type or specialty identifier associated with the information requestor 102.

In some examples, the mapping engine 110 is enabled to access supplemental information, including such information as user demographic information, user employer information, a location of the information requestor 102, etc. In some examples, the supplemental information is included with the information request dataset 105 transmitted to the smart mapping system 104. In other examples, the supplemental information is provided in a separate transmission, for example, in response to a query request for additional information.

The deterministic matcher 210 is illustrative of a software module, system, or device operative to execute a deterministic matching function for determining an exact match between the one or more extracted data elements 107 and an information source candidate 116 stored in the mapping database 112.

As described above, the mapping database 112 includes a mapping table including information source candidates 116, known variants of the information source candidates 116 (e.g., alternate spellings, common misspellings, abbreviations, mnemonics), various properties associated with each of the information source candidates 116, and the information source ID 109 associated with each of the information source candidates 116. In some examples, the mapping database 112 includes global-level information that is applicable to all information requestors 102, state-specific information that is applicable to information requestors 102 in a particular state, and client-specific information that is applicable to a specific information requestor 102.

Figure 3B:
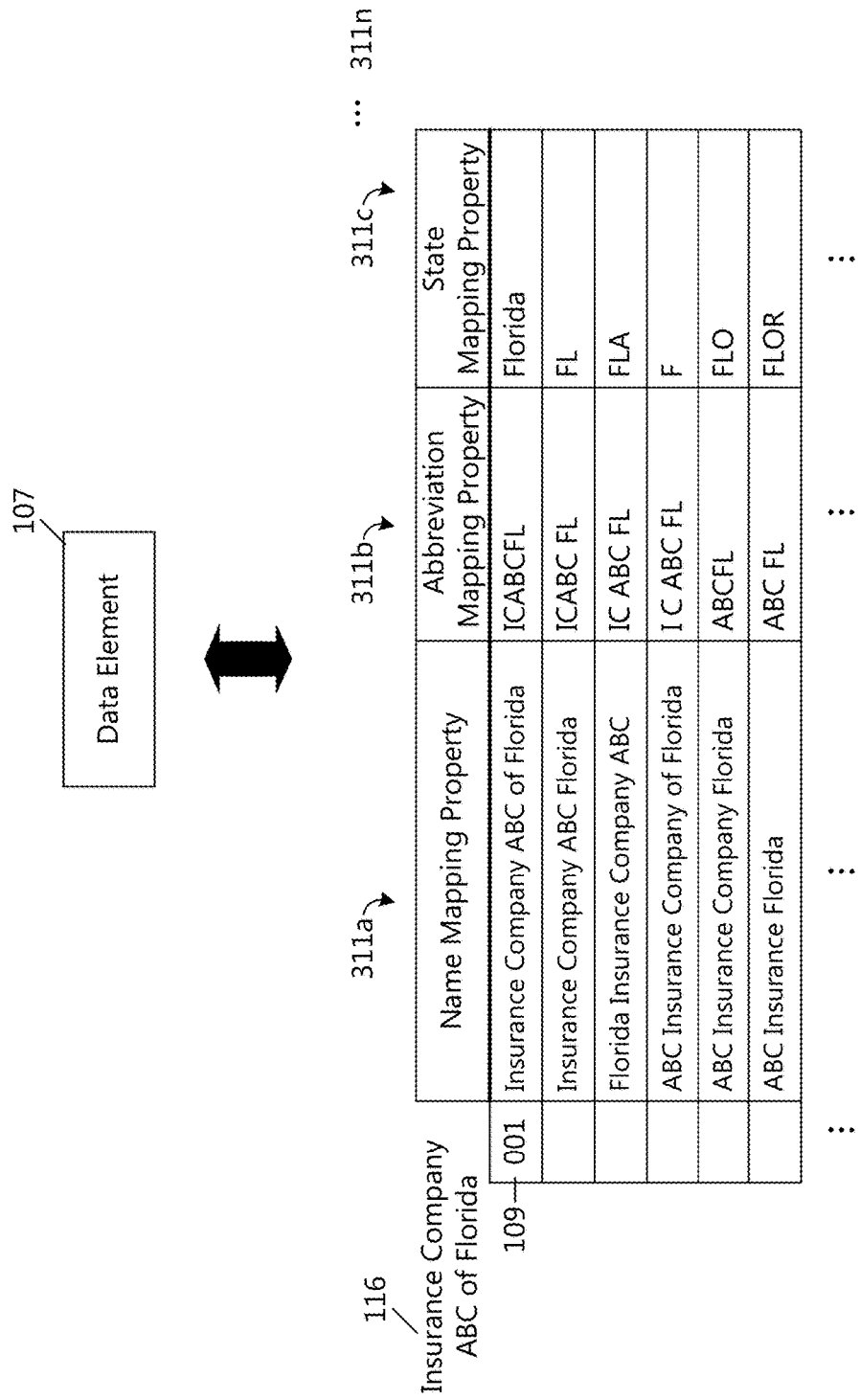
FIG. 3B illustrates example mapping property values that are stored in an example mapping database.

According to an example, the information source candidate 116 information is parsed into various mapping property values 311a-n (collectively, 311). For example, and as illustrated in FIG. 3B, information source candidate 116 information may be parsed into a name mapping property value 311a, an abbreviation mapping property value 311b, and a state mapping property value 311c.

According to an aspect, the deterministic matcher 210 applies a set of mapping property rules arranged in hierarchical levels to compare data elements 107 in a received information request dataset 105 against mapping property values 311 in a sequential order. The deterministic matching algorithm sequentially goes through a hierarchy of mapping properties to compare for finding an exact match between one or more data elements and an information source candidate 116. For example, a first hierarchical level includes matching data elements against a name mapping property value 311a, an abbreviation mapping property value 311b, and a state mapping property value 311c. If an exact match between data elements and a name mapping property value 311a, an abbreviation mapping property value 311b, and a state mapping property value 311c is not found at the first hierarchical level, a second hierarchical level includes matching a predefined subset of the mapping properties that is determined to be a next best match. For example, a second hierarchical rule may include matching data elements against a name mapping property value 311a and a state mapping property value 311c. As another example, a third hierarchical rule may include matching data elements against an abbreviation mapping property value 311b and a state mapping property value 311c. As another example, a fourth hierarchical rule may include matching a data element against a name mapping property value 311a, a fifth hierarchical rule may include matching a data element against an abbreviation mapping property value 311b, etc. The deterministic matching component 210 continues through the hierarchical levels until an exact match is found or until the algorithm is complete.

According to one example, the deterministic matcher 210 is operative to map an information source data element 107 in the received information request dataset 105 to a mapping property value 311 of an information source candidate 116 for identifying an exact match between the data element 107 and a mapping property value of an information source candidate 116. For example, if an information source data element 107 in a received information request dataset 105 is "Insurance Company ABC of Florida," the deterministic matcher 210 is operative to map the information source data element 107 to a matching name mapping property value 311a of an information source candidate 116. Accordingly, the information source candidate 116 is determined to be an exact match and the intended recipient of the information request item 111 associated with the received information request dataset 105.

According to another example, if an information source data element 107 in a received information request dataset 105 is "ICABCFL," the deterministic matcher 210 is operative to map the information source data element 107 to a matching abbreviation mapping property value 311b of an information source candidate 116. Accordingly, the information source candidate 116 is determined to be an exact match and the intended recipient of the information request item 111 associated with the received information request dataset 105.

According to another example, if an information source data element 107 in a received information request dataset 105 is "IC ABC of Florida," the deterministic matcher 210 is operative to map the information source data element 107 to a matching abbreviation mapping property value 311c of an information source candidate 116. Accordingly, the information source candidate 116 is determined to be an exact match and the intended recipient of the information request item 111 associated with the received information request dataset 105.

With reference again to FIG. 2, the mapping engine 110 further includes a probabilistic matcher 212. According to an aspect, when an exact match is not found by the deterministic matcher 210, the probabilistic matcher 212, illustrative of a software module, system, or device, is operative to execute a probabilistic matching function for determining one or more probable matches between one or more data elements 107 in the received information request dataset 105 and one or more information source candidates 116 based on a match agreement score. According to an example, the probabilistic matcher 212 is operative to identify one or more partial matches between a data element 107 and mapping property values 311 of one or more information source candidates 116, and to calculate a match agreement score for each partial match.

For example, if a data element 107 in a received information request dataset 105 is "ABC Florida," the probabilistic matcher 212 is operative to map the data element 107 to one or more mapping property values 311, such as to "ABC of Florida" (e.g., an abbreviation mapping property value 311c for a first information source candidate 116) and "BCBS Florida" (e.g., an abbreviation mapping property value 311c for a second information source candidate 116). The probabilistic matcher 212 then calculates a match agreement score for each identified partial match: "ABC of Florida" and "BCBS Florida." According to one example, the probabilistic matcher 212 calculates a match agreement score based on a number of matching characters between the data element 107 and the partially matching mapping property value 311. For example, the number of characters in "ABC Florida" is 11 including the space. Accordingly, the probabilistic matcher 212 may determine that the partially matching mapping property value 311 "ABC of Florida" has 11 out of 11 matching characters, and thus has a match agreement score of 100% or 1.0. Additionally, the probabilistic matcher 212 may determine that the partially matching mapping property value 311 "BCBS Florida" has 10 out of 11 matching characters, and thus has a match agreement score of 91% or 0.91.

According to an example, the probabilistic matcher 212 is further operative to determine a best matching information source candidate 116 based on the calculated match agreement scores, and determine that the information source 108 associated with the best matching information source candidate 116 is the intended recipient of the information request item 111. Continuing with the example above, the probabilistic matcher 212 may determine that "ABC Florida" is the best match, which is a matching mapping property value 311 associated with the information source candidate 116 "Insurance Company ABC of Florida." Thus, the probabilistic matcher 212 is operative to determine that the information source 108 represented by the information source candidate 116 in the mapping database 112 is the intended recipient of the information request item 111. The probabilistic matcher 212 is further operative to identify the information source ID 109 associated with the information source 108.

In some examples, the probabilistic matcher 212 is operative to separate an information source data element 107 into segments for finding one or more partial matches within the data element 107. For example, the probabilistic matcher 212 is operative to identify any delineators in the information source data element 107 in the received information request dataset 105. If a delineator is identified, the probabilistic matcher 212 divides the information source data element 107 into separate elements according to the identified delineator(s). The probabilistic matcher 212 then attempts to map the separate elements to mapping property values 311 stored in the mapping database 112 for finding one or more partial matches, and calculates a match agreement score based on a number of matching characters between each separate element and each identified matching (exact or partial) mapping property value 311.

According to an aspect, the probabilistic matcher 212 is further operative to perform a set of more complex functions for determining an intended information source 108 for an information request item 111 associated with a received information request dataset 105. For example, an intended information source 108 may be indeterminable from an information source data element 107 provided by the information requestor 102, such as when an information requestor 102 provides only a portion of an information source 108 name or abbreviation, or when an information requestor 102 omits information that distinguishes a particular information source 108. In one aspect, when an exact match is not identified, the probabilistic matcher 212 is operative to determine an information source candidate 116 based at least in part on state-specific information. In some examples, the probabilistic matcher 212 a state associated with an information source 108 is not specified. For example, an information requestor 102 may provide a description of an information source 108 such as "Medicaid" or "BCBS®," wherein the information source 108 cannot be determined from the provided description. Accordingly, the probabilistic matcher 212 is operative to determine a probable state of the information source 108 according to known or gathered information.

According to one example, the probabilistic matcher 212 is operative to determine a probable state of the information source 108 according to location data (e.g., address) associated with the information requestor 102. As described above, location data associated with the information requestor 102, along with other information requestor 102 information, may be included in and extracted from an information request dataset 105.

According to another example, the probabilistic matcher 212 is operative to determine a probable state of the information source 108 according to information associated with the user 114. For example, various pieces of supplemental information, such as a user's 114 demographic information, user employer information, etc., may be included in and extracted from an information request dataset 105. In other examples, the supplemental information may be provided to the mapping engine 110 in a separate transmission (e.g., in response to a query request for the user's home address or the user's work address).

According to another example, the probabilistic matcher 212 is operative to determine a probable state of the information source 108 according to other information source 108 information. For example, in a healthcare system operating environment, the user 114 may have health insurance coverage from a plurality of payers (i.e., information sources 108). Accordingly, information associated with another information source 108 (e.g., primary payer, secondary payer, tertiary payer) may be provided in an information request dataset 105, or may be provided by the information requestor 102 in a separate transaction.

When other information source 108 information is available, the probabilistic matcher 212 is operative to parse the information for location information. For example, if a primary information source 108 is indeterminate (e.g., "Medicaid"), and a secondary information source 108 is provided that indicates a state (e.g., "BCBSTN®"), the probabilistic matcher 212 is operative to utilize the location information or state associated with the secondary information source for determining a probable location/state to associate with the primary information source.

According to an aspect, the probabilistic matcher 212 is operative to determine a probable state associated with an information source 108 based at least in part on a confidence score calculated by the probabilistic matcher 212. Various weights may be assigned to a probable state according to the information used to determine the probable state (e.g., information requestor 102 information, user 114 information, other information source 108 information). For example, a first confidence weight may be assigned to a probable state determined based on information requestor 102 information, a second confidence weight may be assigned to a probable state determined based on user 114 information, and a third confidence weight may be assigned to a probable state determined based on other information source 108 information.

According to an example, a higher confidence weight is assigned based on consistency of results. For example, if based on information requestor 102 information, a probable state associated with an information source 108 is determined to be Georgia (e.g., the information requestor 102 is located in Georgia), but another probable state is determined to be Tennessee based on the user's home address and the user's work address and based on a secondary information source 108, a probabilistic matcher 212 may assign a higher confidence weight to Tennessee.

Upon determining a probable state associated with an information source 108, the probabilistic matcher 212 is operative to map the state along with one or more data elements 107 provided in the information request dataset 105 to one or more information source candidates 116 stored in the mapping database 112. For example, continuing with the example from above where an information requestor 102 provides a description of an information source 108 such as "Medicaid," wherein the information source 108 cannot be determined from the provided description, upon determining a probable state of the information source 108 according to known or gathered information, for example, Tennessee, the probabilistic matcher 212 is operative to use the information source description ("Medicaid") in addition to the determined probable state (Tennessee) to determine identify Tenncare (e.g., Tennessee's Medicaid program) as the matching information source candidate 116.

With reference still to FIG. 2, in some examples, the mapping engine 110 includes a notification engine 214 illustrative of a software module, system, or device, operative to provide real-time or near real-time feedback to the information requestor 102. For example, when an administrative user inputs information request data elements 107 into the information requestor user agent 124, and an information request dataset 105 is transmitted to the smart mapping system 104, and when an exact match, a best probable match, or one or more probable matches is/are determined, the notification engine 214 is operative to transmit the identified information source(s) 108 to the user agent 124 in real-time or near real-time.

According to one example, when an exact match of an information source 108 is determined, the notification engine 214 is operative to transmit a notification of the identified exact matching information source 108 to the user agent 124 to display to the administrative user as a verified information source 108.

According to another example, when a plurality of probable information sources 108 are determined, the notification engine 214 is operative to transmit the more than one probable matching information sources 108 to the user agent 124 to display to the administrative user as suggestions from which the administrative user can select the intended information source 108.

An example of a user interface 400 that may be displayed to an administrative user by the user agent 124 via which the administrative user may enter data elements 107 for generating a dataset 105 to transmit to the smart mapping system 104 and via which a notification 402 may be displayed is illustrated in FIG. 4. According to an example and as illustrated, the notification engine 214 is operative to transmit a best probable matching information source 108 to the user agent 124 to present to the administrative user as a best guess suggestion 404. Accordingly, the administrative user is enabled to either accept the suggestion or reject and reenter one or more data elements 107 to retransmit to the mapping engine 110.

According to another example, if an exact match or probable match is not found, or if a probable match has a match agreement score that is below a predetermined threshold, the notification engine 214 is operative to transmit a notification to the user agent 124 informing the administrative user that the information source 108 is not valid or cannot be verified. Accordingly, the administrative user is enabled to correct or reenter one or more data elements 107 to retransmit to the mapping engine 110.

With reference again to FIG. 2, the mapping engine 110 further includes an output engine 216 illustrative of a software module, system, or device, operative to apply the information source ID 109 of a determined information source 108 to an information request item 111. The output module 216 is further operative to transmit the information request item 111 to one or more downstream processing systems 106A-N (collectively, 106).

The mapping engine 110 includes a match analyzer 218, illustrative of a software module, system, or device, operative to record a history of matches made and calculated match agreement scores, determine whether a match was an accurate match or an inaccurate match, and monitor trends for improving and refining the system. According to an aspect, the match analyzer 218 is operative to determine whether a particular data element 107 is repeatedly used by one or more information requestors 102, and whether the repeatedly used data element 107 should be added to the mapping database 112 as a mapping property value 311 for a particular information source candidate 116. The determination may be made based at least in part on a frequency of user of the particular data element 107. When a determination is made that a particular data element 107 should be added to the mapping database 112, the match analyzer 218 is further operative to add the data element 107 to the mapping database 112.

In some examples, the match analyzer is operative to determine from a received information response item 113 whether a determined information source 108 for a corresponding information request item 111 is correct or incorrect. For example, if a user 114 associated with the information request item 111 cannot be verified, the match analyzer 218 is operative to determine a next best matching information source candidate 116 as the intended information source 108 recipient. According to one example, the match analyzer 218 is operative to determine a next best matching information source candidate 116 based at least in part on a match agreement score calculated by the deterministic matcher 210 or the probabilistic matcher 212. Accordingly, the output engine 216 may then apply the information source ID 109 associated with the next best matching information source candidate 116 to the information request item 111, and transmit the information request item 111 to the one or more downstream processing systems 106 for transmission of the information request item(s) 111 to the intended information source 108.

In some examples, the match analyzer 218 is further operative to record a history of matches made and the calculated match agreement scores, receive and store an indication of whether a match was an accurate match or an inaccurate match, and monitor trends for improving and refining the system. When a trend is identified, the match analyzer 218 is operative to add mapping property values 311 to the mapping database 112 to improve matching results according to the identified trend. For example, a second-best matching information source candidate 116 according to a match agreement score may be found to be a more accurate match than a first-best matching information source candidate 116 for a particular information requestor 102. In response, the match analyzer 218 is operative to identify this trend and adjust the match agreement scores accordingly for the particular information requestor 102.

According to another example, a particular information requestor 102 may, for various reasons, provide services for a large number of users 114 who are affiliated with an information source 108 of a certain state that is outside of the state where the information requestor 102 is located. For example, a company that is headquartered in one state (e.g., Georgia) and has a regional facility located in another state (e.g., Texas) may employ a large number of employees at the regional facility for which the company provides benefits through a payer (i.e., information provider 108) that is based in the state of the company's headquarters (e.g., Georgia).

When registering users 114 for services provided by the information requestor 102, an administrative user may not correctly identify the payer. For example, the administrative user may exclude a state value (e.g., GA or Georgia) associated with the name of the payer (e.g., enter "BCBS® rather than BCBSGA® or BCBS® Georgia) that would distinguish the payer. The probabilistic matcher 212 may be utilized to determine a best probable match of an information source 108 based on the received data elements 107. A first best match of an information source 108 may be a payer based in the state of the information requestor 102 (e.g., Texas). However, upon determining that the first best match is an incorrect match, the smart mapping engine 110 may successfully try the second-best match (e.g., payer based in Georgia). This scenario may be recurrent due to the large number of employees of the company who seek services provided by the certain information requestor 102. Accordingly, the match analyzer 218 is operative to recognize this trend, and adjust the calculation of the match agreement score for the particular information requestor 102 such that the second-best match (e.g., payer based in Georgia) becomes the best match.

Figure 5:
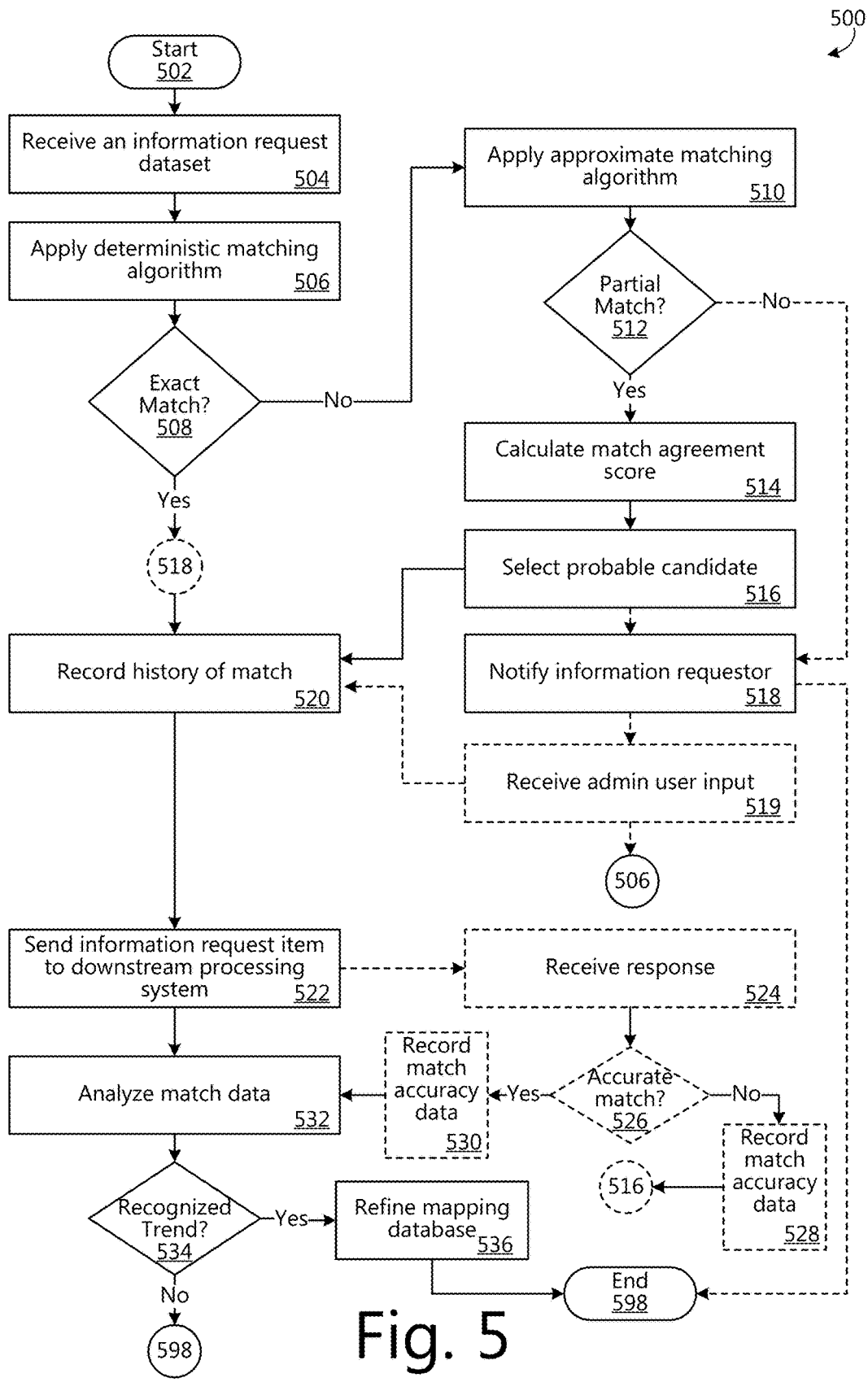
FIG. 5 is a flow chart showing general stages involved in an example method for smart mapping.

FIG. 5 is a high level flowchart of one example of a smart mapping method 500. The method 500 starts at OPERATION 502, and proceeds to OPERATION 504, where an information request dataset 105 associated with a request for information from an information source 108 is received from an information requestor 102. According to an aspect, the smart mapping system 104 receives the information request item after data elements 107 associated with an information request item 111 is input into the information requestor user agent 124 running on a client device 122. For example, an administrative user may enter various pieces of information, such as information about the information source 108 (e.g., payer name), information about the information requestor 102 (e.g., healthcare provider name, healthcare provider identifier, healthcare provider type, city and state of the healthcare provider, place of treatment, etc.), and information about the subject of the information request (e.g., patient identifier, patient name, group number, etc.). In some examples, a data element 107 identifying an information source 108 is a text-based value, and may be complete, partially complete, or incomplete. Receipt of the information request dataset 105 is a trigger to the mapping engine 110 to identify an information source 108 as the recipient of the information request item from the information provided in the information request dataset 105. In one example, the information request item 111 is an eligibility and benefits inquiry from a healthcare provider (information requestor 102).

The method 500 proceeds to OPERATION 506, where a deterministic matching function is applied by the deterministic matcher 210 for finding an exact match between information in the information request item and an information source candidate 116 stored in the mapping database 112. The deterministic matcher 210 applies a set of hierarchically arranged mapping property rules to sequentially compare data elements 107 in a received information request dataset 105 against mapping property values 311 for finding an exact match with an information source candidate 116. The deterministic matcher 210 continues through the hierarchical levels until an exact match is found or until the rules are complete.

At DECISION OPERATION 508, a determination is made as to whether or not an exact match is found. If an exact match is found, the method 500 optionally proceeds to OPERATION 518, where the notification engine 214 transmits a notification 402 to the user agent 124 of the exact match. For example, the notification 402 may be provided to alert the administrative user that data elements 107 input by the administrative user match an information source 108. At OPERATION 520, a record of the exact match is stored.

If an exact match is not made, the method 500 advances to OPERATION 510, where the probabilistic matcher 212 executes a probabilistic matching function for determining one or more probable matches between one or more data elements 107 in the received information request dataset 105 and one or more information source candidates 116 based on a match agreement score. In determining one or more probable matches, the probabilistic matcher 212 identifies one or more partial matches between a data element 107 and mapping property values 311 of one or more information source candidates 116, and calculates a match agreement score for each partial match. If more than one information source candidate 116 is identified as a probable match, the mapping engine 110 is further operative to determine a best matching information source candidate 116, and determine that the information source 108 associated with the best matching information source candidate 116 is the intended recipient of the information request item 111. In some examples, the probabilistic matcher 212 identifies delineators in an information request item data element 107, and divides the information request item data element into segments for finding one or more partial matches between the information request item and an information source candidate 116 stored in the mapping database 112.

At DECISION OPERATION 512, a determination is made as to whether one or more partial matches are found. If a partial match is not found, the method 500 optionally advances to OPERATION 518, where a notification is sent to the information requestor 102 that a match was unable to be made, or ends at OPERATION 598. If a determination is made at DECISION OPERATION 512 that one or more matches are found, the method 500 proceeds to OPERATION 514, where the probabilistic matcher 212 calculates a match agreement score of each partial match. In some examples, the match agreement score is a percentage of matching characters between the data element and the candidate 116. For example, for a partial match, if four out of seven characters match a mapping property value 311, the confidence score of the partial match is 57.14%. In other examples, the match agreement score is based at least in part on weighting factors associated with the information used to determine a probable match (e.g., user demographic information, user employer information, a location of the information requestor 102).

The method 500 advances to OPERATION 516, where the probabilistic matcher 212 selects a probable information source candidate 116. In some examples, the probabilistic matcher 212 selects a probable information source candidate 116 with the highest match agreement score. The method 500 proceeds to OPERATION 520, where a record of the match is stored, or optionally proceeds to OPERATION 518, where the notification engine 214 transmits a notification 402 to the user agent 124 of a best probable match or one or more probable matches in real-time or near real-time. At optional OPERATION 519, administrative user input is received. If a selection of a probable match is received, the method 500 proceeds to OPERATION 520, where the match is recorded. If additional or corrected data elements 107 are received, the method 500 returns to OPERATION 506.

The method 500 proceeds to OPERATION 522, where an identifier associated with the determined information source 108 is added to the information request item 111, and the output module 216 sends the information request item 111 to a downstream processing system 106 for processing and ultimately, for transmission to the determined information source 108. For example, the output module 216 sends an eligibility and benefits inquiry to an eligibility and benefits processing system.

In some examples, the method 500 advances to optional OPERATIONS 524-530, where the smart mapping system 104 receives an information response item 113 associated with the information request item 111 (524); determines whether the determined match was accurate or inaccurate match based on the response (526); and records the match accuracy data (528,530). If the match was inaccurate, the method 500 returns to OPERATION 516 from OPERATION 528, where the mapping engine 110 determines a next best match.

If the match was accurate, the method 500 proceeds from OPERATION 530 to OPERATION 532, where the match analyzer 218 analyzes the match data, and at DECISION OPERATION 534, the matching analyzer 218 determines if there are any recognized trends. For example, when a particular input data element 107 from an information requestor 102 is repeatedly being matched with a particular information source 108.

If a trend is recognized, at OPERATION 536, the matching analysis module 218 refines the mapping database 112 according to the recognized trend. Accordingly, when the input element 107 is received in a future information request dataset 105 from the information requestor 102, the mapping engine 110 will recognize the data element 107 in associated with a particular information source 108. The method 500 ends at OPERATION 598.

FIGS. 6A-E illustrate various circuit diagrams for circuits applicable to digital devices, such as a probabilistic matcher 212, operable to perform various rules and comparisons as part of the systems and devices of the present disclosure. As illustrated in FIGS. 6A-E, bits from a first data source are labeled with an "a" and bits from a second data source are labeled with a "b" so that their source may be readily apparent. First input bits 611 and nth input bits 612 correspond to different bits on which data are encoded, comprising the data from the first and second data sources being compared, such that first input bit 611a and nth input bit 612a are from the first data source, and first input bit 611b and nth input bit 612b are from the second data source.

The circuits are sized to accommodate the largest possible data field from the probabilistic matcher 212. For example, when a data field contains a maximum of twelve characters, each character being encoded in one byte (e.g., according to ASCII or a basic Latin set from the UTF-8 standard), the logic gate array will accept up to 192 inputs (i.e., 12*8*2 inputs). When the data within a data field do not fully fill that data field, such as when only twelve characters are encoded in a field with a maximum size of thirteen characters, any unused bits may be set to zero/FALSE or no input to the corresponding leads of a given logic gate array will provided.

An arrayed logic gate will accept multiple inputs to produce a single output per the truth table of the logic gate. For example, an AND logic gate array 620 will accept n inputs and produce one output, wherein than one output will return zero/FALSE unless all of the n inputs are one/TRUE, in which case it will return one/TRUE. In another example, an OR logic gate array 630 will accept n inputs and will produce one output, wherein that one output will return one/TRUE if any of the n inputs is one/TRUE, otherwise the logic gate array will return zero/FALSE. One of ordinary skill in the art will be familiar with the truth tables of different logic gate arrays. One of ordinary skill in the art will also be familiar with the construction of logic gate arrays from various transistors (e.g., Bipolar Junction (BJT), Field Effect (FET), etc.), diodes, resistors, memristors, and combinations thereof that are stand-alone electrical components, part of an integrated circuit, or provided by a processor.

As will be appreciated, a rule may make multiple uses of one or more of the example circuits to provide greater nuance in comparisons between data sources. For example, multiple existence checks may be performed against a rule definition to determine whether an input falls outside of a range (or falls within a category of a plurality of categories). The multiple outputs from these circuits may be combined via AND or OR operations to return a passing state or a failing state of the rule. Alternatively, when only one circuit is used, its output's state may be used to return a passing or failing state of the rule.

Figure 6A:
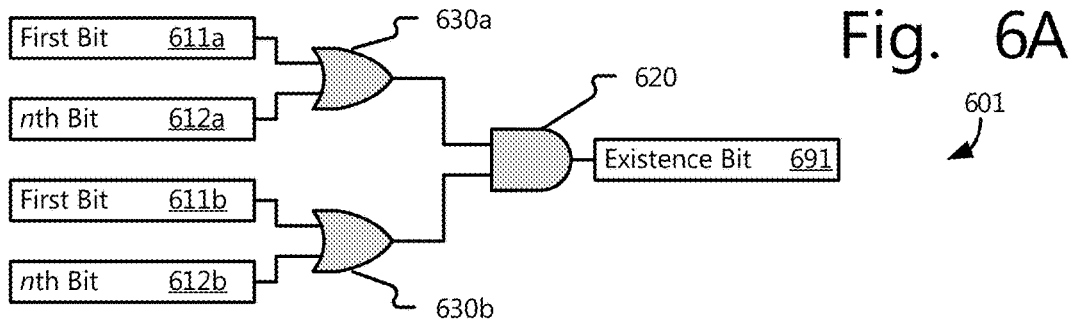
FIGS. 6A-E illustrate various circuit diagrams for circuits operable to perform various rules and comparisons.

FIG. 6A is an example diagram of an existence circuit 601 corresponding to a rule for comparing whether data coexist in data inputs. As illustrated, each of the bits from two data sources are input into an OR logic gate array 630. First input bit 611a through nth input bit 612a from the first data source are fed into a first OR logic gate array 630a, and first input bit 611b through nth input bit 612b from the second data source are fed into a second OR logic gate array 630b. The output of the first OR logic gate array 630a is then combined with the output of the second OR logic gate array 630b via an AND logic gate array 620 to produce an existence bit 691 to indicate that the data from the first and second data sources exist, as defined by each other, with a one/TRUE value, or that at least one does not exist with a zero/FALSE value. As will be appreciated, if the first data source represents a rule definition that is known to exist, the first OR logic gate array 630a may be replaced with a one/TRUE value input to reduce the number of logic gate arrays required.

Figure 6B:
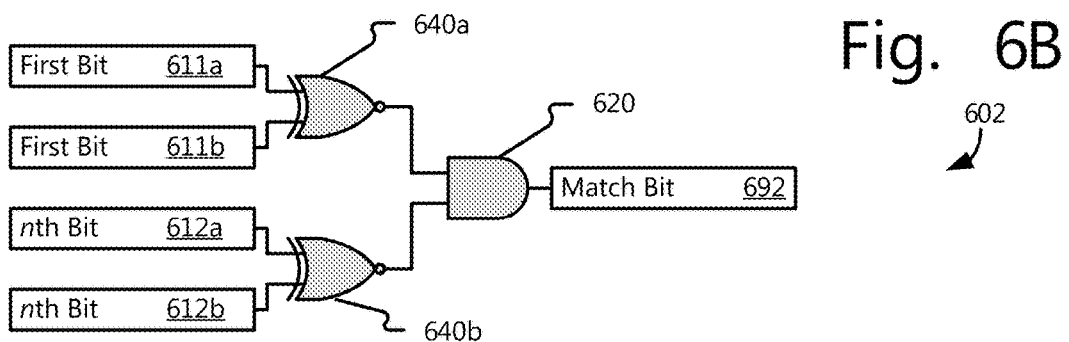

FIG. 6B is an example diagram for a matching circuit 602 corresponding to a rule for comparing whether the data from the first and second data sources match. Each bit from the first data source is combined with the corresponding bit from the second data source via an XNOR logic gate array 640. For example, a first input bit 611a from a rule definition will be XNORed with a first input bit 611b from the information request dataset 105 via a first XNOR logic gate array 640a, and an nth input bit 612a from a rule definition will be XNORed with an nth input bit 612b from the information request dataset 105 via an nth XNOR logic gate array 640b. The output of the first XNOR logic gate array 640a is then combined with the output of the nth XNOR logic gate array 640b via an AND logic gate array 620 to produce a match bit 692 to indicate a match with a one/TRUE value, or no match with a zero/FALSE value.

A rule may allow for inexact matches as well as exact matches. Therefore, the input bits to the matching circuit 602 may be substituted or discarded from consideration via bit shifting or ignoring portions of the data to be compared. For example, input data for a personal name may be "DOE JOHN", whereas a rule definition for a name may have "DOE JOHN Q", and the bits used to encode the extra "Q", which are not found in the input data, may be ignored so that the data may be considered to be matching. Similarly, if a different rule definition used the name value "DOE JONATHAN", the term "JONATHAN" could be recognized by a separate matching circuit 602 so that the term "JOHN" may be substituted for "JONATHAN" when comparing the data, so that an inexact match will return one/TRUE. In various aspects, the separate circuits for exact and inexact matches may be combined via an OR gate to provide a single output.

Figure 6C:
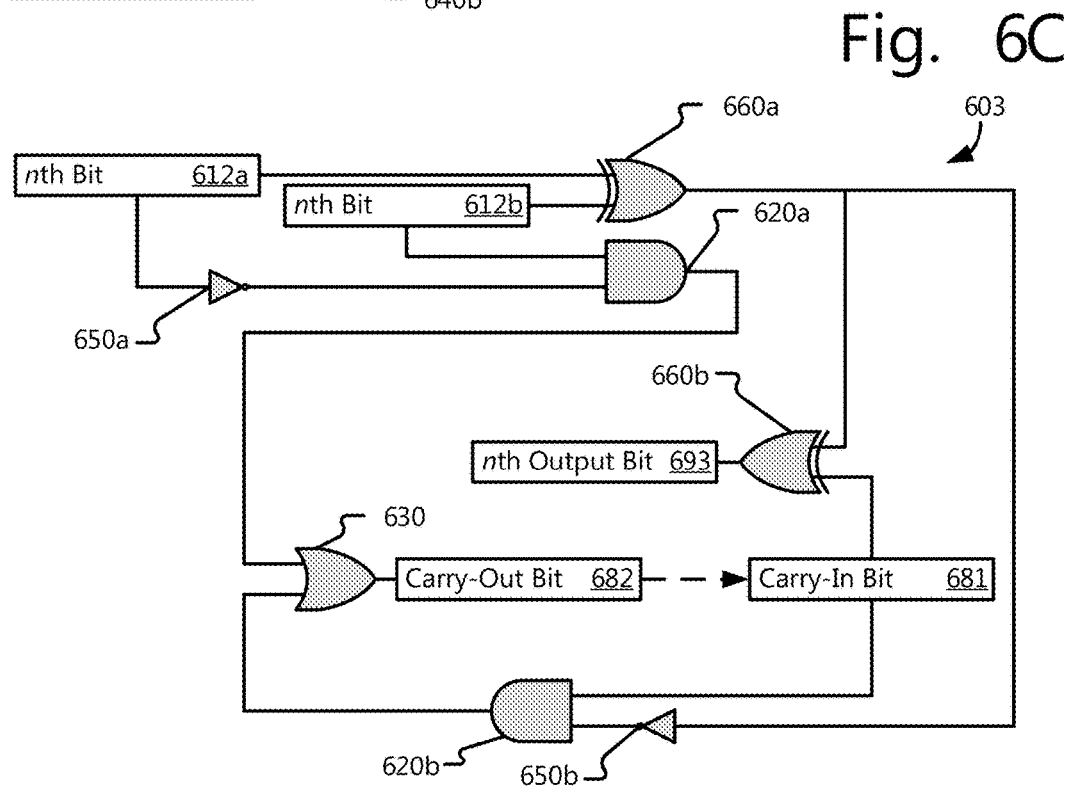

FIG. 6C is an example diagram for a bitwise subtractor circuit 603 corresponding to a rule for finding the difference between two sets of data. In various aspects, before subtracting one set of data from another, the values of those data are converted from character representations of digits of that number (e.g., in the UTF-8 or ASCII formats) to a binary representation of that number. For example, the number twelve in UTF-8 format is represented as two characters (i.e., "1" and "2"), each with its own encoding for the digit it represents ($0011\ 0001_{x2}$ and $0011\ 0010_{x2}$, respectively), whereas the number twelve in binary notation is represented as $0000\ 1100_{x2}$. As will be understood, there are multiple ways to represent a number in a binary format that account for negative and fractional numbers, and the precise format may vary in different aspects so long as the number is represented as a whole and not via individual representations of the digits.

As will be recognized, bitwise subtraction operations include inputs bits for a minuend, a subtrahend, and a carry-in, and produce outputs bits for a difference and a carry-out. The minuend is the input from which the subtrahend is subtracted, which are illustrated as the nth input bit 612a from the first data source and the nth input bit 612b from the second data source respectively.

A carry-in bit 681 represents "carry-over" from a previous bitwise subtraction operation (e.g., from the (n−1)th bits from the two data sources) and a carry-out bit 682 represents "carry-over" from the current operation to the next bitwise subtraction operation (e.g., for the (n+1)th bits from the two data sources). The carry-in bit 681 for the first bits subtracted will be zero/FALSE, but for any subsequent bits will be equal to the carry-out bit 682 from the previous bits' operation. Thus, for subtraction of numbers represented n bits, n or more bitwise subtractor circuits 603 are chained together by their carry-in bits 681 and carry-out bits 682, and the chain begins with the least significant bits representing the two numbers.

In the example diagram, the value of the carry-out bit 682 is determined via an OR logic gate array 630, which takes its inputs from the outputs of a first AND logic gate array 620a and a second AND logic gate array 620b. The first AND logic gate array 620a uses the subtrahend and an inversion of the minuend's value, via first inverter 650a, as inputs for an AND operation. The second AND logic gate array 620b uses the carry-in bit 681 and an inversion, via second inverter 650b, of a XORing, via first XOR logic gate array 660a, of the minuend and the subtrahend as inputs for an AND operation.

In the example diagram, the minuend is XORed with the subtrahend via the first XOR logic gate array 660a, which is in turn XORed with the carry-in bit 681 via the second XOR logic gate array 660b to produce the nth output bit 693. The carry-in bit 681 is equal to the carry-out bit 682 for the previous subtraction operation. Each operation of the bitwise subtractor circuit 603 results in one output bit 693, and the output bits 693 are assembled into the difference between the numbers from the two structured sets of data in order from least significant bit to most significant bit. For example, for the operation of four ($0100_{x2}$) minus two ($0010_{x2}$), the first output bit 693 would be zero/FALSE and the second output bit 693 would be one/TRUE to yield the difference of two ($0010_{x2}$) with zero/FALSE in the least significant position and one/TRUE in the next most significant position based on the order of output from the example bitwise subtractor circuit 603.

In various aspects, a series of subtractor circuits 603 are used in combination with an existence circuit 601 to determine whether a value exceeds the bounds of a threshold rule. For example, for determining whether a value is greater than a threshold, a series of subtractor circuits 603 will be used subtract a threshold from a value, and the result is checked via an existence circuit 601 to see if the result has a positive value, indicating that the value is greater than the threshold. In an alternative example, for determining whether a value is less than a threshold, series of subtractor circuits 603 will be used to subtract the value from the threshold, and the result is checked via an existence circuit 601 to see if the result has a positive value, indicating that the value is less than the threshold. As will be appreciated, depending on how negative and positive values are tracked, a bit used to indicate sign (i.e., positive or negative), may be ignored by the existence circuit 601 in the above examples.

Figure 6D:
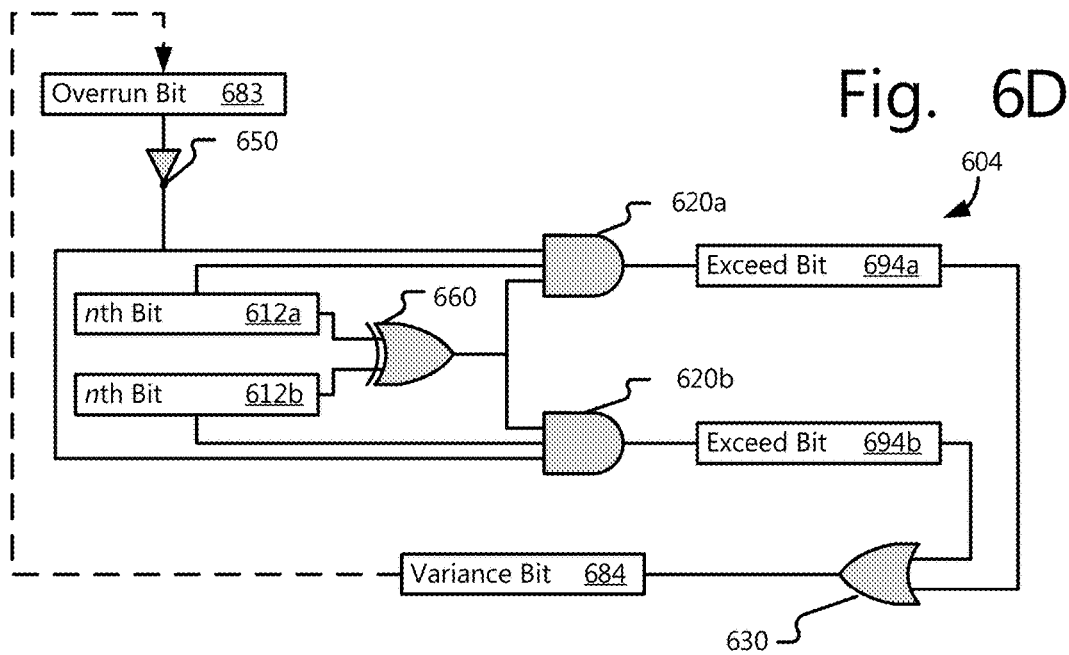

FIG. 6D is an example diagram for a bitwise sizing circuit 604 corresponding to a rule for finding which of two sets of data has the greater (or lesser) value. A sizing circuit 604 may be used to determine whether input from a first data source exceeds input from a second data source. Similarly to a subtractor circuit 603, the values of these data are converted from character representations of digits of a number to a binary representation of that number as a whole before inputting those data to the sizing circuit 604. As will be understood, there are multiple ways to represent a number in a binary format that account for negative and fractional numbers, and the precise format may vary in different aspects so long as the number is represented as a whole and not via individual representations of the digits.

As will be recognized, bitwise sizing operations include inputs bits from the data sources to compare and an overrun, and produce outputs bits for indicating whether one set of data is greater than the other and a variance. The inputs from the data sources are illustrated as the nth input bit 612a from the first data source and the nth input bit 612b from the second data source respectively.

An overrun bit 683 represents "carry-over" from a previous bitwise sizing operation (e.g., from the (n+1)th bits from the two data sources) and a variance bit 684 represents "carry-over" from the current operation to the next bitwise sizing operation (e.g., to the (n−1)th bits from the two data sources). The overrun bit 683 for the first bits sized will be zero/FALSE, but for any subsequent bits will be equal to the variance bit 684 from the previous bits' operation. Thus, for sizing numbers represented n bits, n or more bitwise sizing circuits 604 are chained together by their overrun bits 683 and variance bits 684, and the chain begins with the most significant bits representing the two numbers. As will be appreciated, if a given number includes fewer bits in its representation than another number, it will be padded with leading zeroes so that the comparison of most significant bits will compare the same values, accounting for any bits used for designating negative/positive values (e.g., when comparing binary five ($0101_{x2}$) to binary twenty-five ($0001\ 1001_{x2}$), binary five may be padded to be represented as $0000\ 0101_{x2}$ for a bitwise comparison with twenty-five).

In the example diagram, each exceed bit 694 represents whether the associated nth input bit 612 is larger than the nth input bit 612 from the other data source. For example, first exceed bit 694a will be one/TRUE when first nth input bit 612a (associated with the first data source) exceeds second nth input bit 612b (associated with the second data source). Similarly, second exceed bit 694b will be one/TRUE when second nth input bit 612b exceeds first nth input bit 612a. A given bit exceeds another bit when the given bit is equal to one/TRUE and the other bit is equal to zero/FALSE.

Starting with the most significant bits, nth input bit 612a is compared with nth input bit 612b via an XOR logic gate array 660, the result of which is input to first AND logic gate array 620a and second AND logic gate array 620b. Each of the AND logic gate arrays 620 also accept an inversion of the overrun bit 683, produced by inverter 650, and the associated nth input bit 612 as inputs. First AND logic gate array 620a produces exceed bit 694a to indicate that nth input bit 612a exceeds nth input bit 612b, and that no data source in a previous iteration was determined to exceed the other by setting exceed bit 694a to one/TRUE, and otherwise setting it to zero/FALSE. Second AND logic gate array 620b produces exceed bit 694b to indicate that nth input bit 612b exceeds nth input bit 612a, and that no data source in a previous iteration was determined to exceed the other by setting exceed bit 694b to one/TRUE, and otherwise setting it to zero/FALSE.

To ensure that the sizing circuit 604 tracks whether bits of greater significance from the data sources have already determined that one dataset is greater than the other, the first exceed bit 694a and the second exceed bit 694b are combined via an OR logic gate array 630 to produce the variance bit 684. The value of the variance bit 684 is used as the value for the overrun bit 683 for the next-most significant bit to be compared by the sizing circuits 604 in the series.

When the data from the first and second data sources are equal, the exceed bits 694a, 694b will all produce zero/FALSE, but when the data from one data source exceeds the other's data (i.e., has a higher value), the associated exceed bit 694 from the first iteration of the chain of sizing circuits 604 that determines that one set of data exceeds the other will produce one/TRUE and all other exceed bits 694 will produce zero/FALSE. As will be appreciated, each of the first exceed bits 694a and second exceed bits 694b may be aggregated and combined via associated aggregating OR logic gate arrays 630 (not illustrated; one for all the first exceed bits 694a and one for all the second exceed bits 694b) between each iteration of the sizing circuit 604 for a single determination to be provided. Alternatively, each iteration of the sizing circuit 604 in a chain of sizing circuits 604 may write to the same bit, if the variance bit 684 enables a breakout from the series of circuits, in which case the overrun bit 683, inverter 650, and supporting circuitry may be omitted.

Figure 6E:
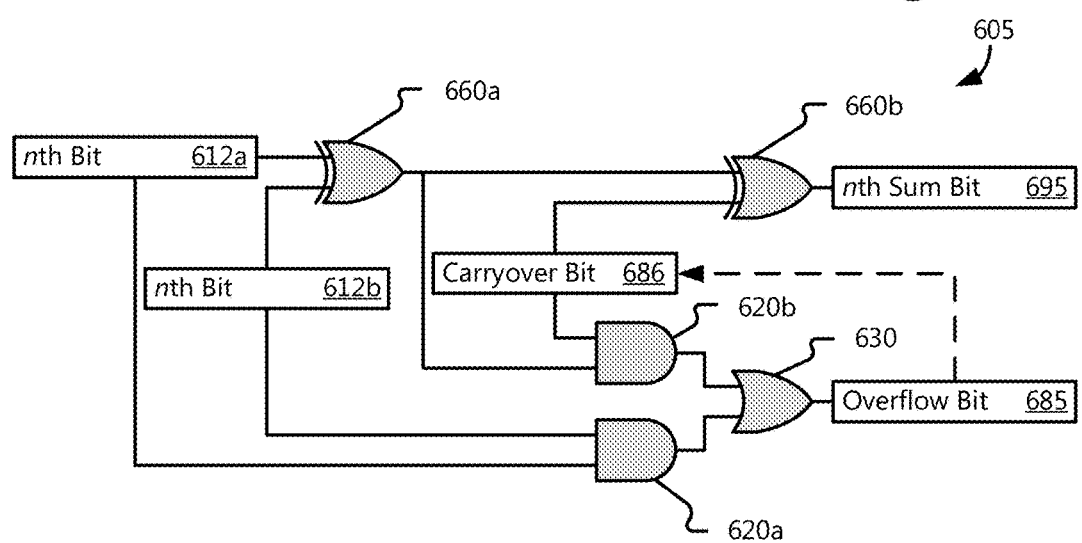

FIG. 6E is an example diagram for a bitwise full-adder circuit 605 corresponding to a rule for finding the sum of two sets of data. Similarly to subtractor circuits 603 and sizing circuits 604, the values of these data are converted from character representations of digits of a number to a binary representation of that number as a whole before inputting those data to the full-adder circuit 605. As will be understood, there are multiple ways to represent a number in a binary format that account for negative and fractional numbers, and the precise format may vary in different aspects so long as the number is represented as a whole and not via individual representations of the digits.

As will be recognized, bitwise addition operations include inputs bits for the terms to be added and a carryover, and produce outputs bits for a sum and an overflow. The terms are the bits from the data sources, which are illustrated as the nth input bit 612a from the first data source and the nth input bit 612b from the second data source respectively.

A carryover bit 686 represents "carry-over" from a previous bitwise addition operation (e.g., from the (n−1)th bits from the two data sources) and an overflow bit 685 represents "carry-over" from the current operation to the next bitwise addition operation (e.g., for the (n+1)th bits from the two data sources). The carryover bit 686 for the first bits added will be zero/FALSE, but for any subsequent bits will be equal to the overflow bit 685 from the previous bits' operation. Thus, for addition of numbers represented n bits, n or more bitwise full-adder circuits 605 are chained together by their carryover bits 686 and overflow bits 685, and the chain begins with the least significant bits representing the two numbers, which is referred to as a ripple full-adder.

As illustrated, nth sum bit 695 is the product of an XOR operation at second XOR logic gate array 660b of the carryover bit 686 and the product of the first XOR logic gate array 660a of the nth input bit 612a and the nth input bit 612b. To produce the overflow bit 685, which is used as the carryover bit 686 for a subsequent full-adder circuit 605 in a ripple full-adder, the output of the first AND logic gate array 620a and the output of the second AND gate array 620b are ORed by OR logic gate array 630. The first AND logic gate array 620a uses the carryover bit 686 and the output of the first XOR logic gate array 660a as inputs, and the second AND logic gate array 620b uses the nth input bit 612a and the nth input bit 612b as inputs. For example, for the operation of one ($0001_{x2}$) plus three ($0011_{x2}$), the first sum bit 695 would be zero/FALSE (with an first overflow bit 685 of one/TRUE), the second sum bit 695 would be zero/FALSE (with an first overflow bit 685 of one/TRUE), the third sum bit 695 would be one/TRUE (with an first overflow bit 685 of zero/FALSE), to yield the sum of four ($0100_{x2}$) with zero/FALSE in the two least significant positions and one/TRUE in the second most significant position based on the order of output from the example bitwise full-adder circuit 605.

Aspects of the present disclosure are implemented via local, remote, or a combination of local and remote computing and data storage systems. Such memory storage and processing units are implemented in a computing device, such as computing device 700. Any suitable combination of hardware, software, or firmware is used to implement the memory storage and processing unit. For example, the memory storage and processing unit is implemented with computing device 700 or any other computing devices 722, in combination with computing device 700, wherein functionality is brought together over a network in a distributed computing environment, for example, an intranet or the Internet, to perform the functions as described herein. Such systems, devices, and processors (as described herein) are examples and other systems, devices, and processors comprise the aforementioned memory storage and processing unit, consistent with embodiments of the invention.

Figure 7:
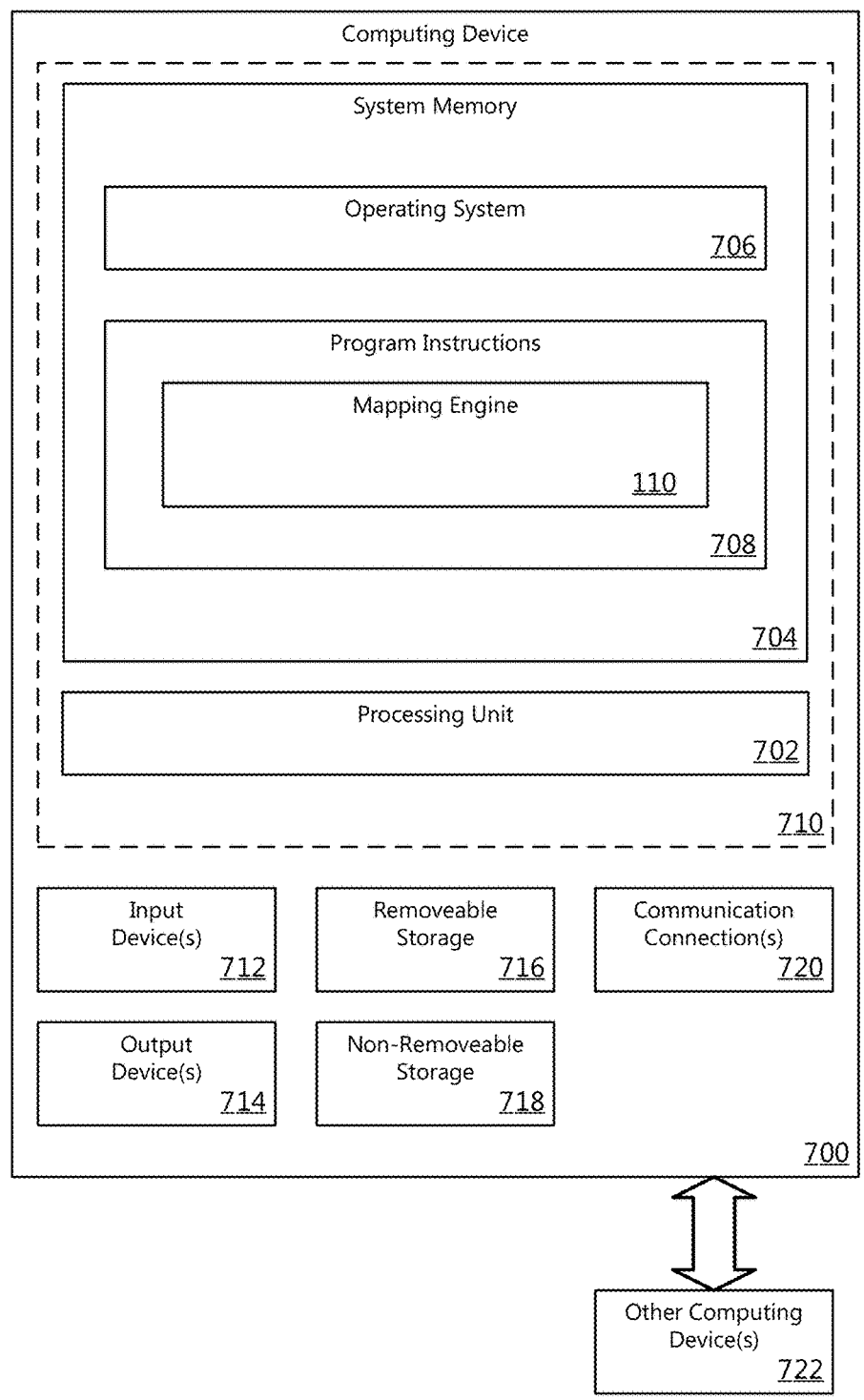
FIG. 7 is a block diagram illustrating example physical components of a computing device with which aspects of the system may be practiced.

FIG. 7 illustrates one example of a computing device suitable to implement aspects of the present disclosure. The computing device 700 includes at least one processing unit 702 and a system memory 704. The system memory 704 comprises, but is not limited to, volatile (e.g. random access memory (RAM)), non-volatile (e.g. read-only memory (ROM)), flash memory, or any combination. System memory 704 includes operating system 706, one or more programming modules 708, and according to an aspect, includes the smart mapping engine 110, which when executed, performs functionalities as described herein. Operating system 706, for example, is suitable for controlling the operation of computing device 700. Furthermore, According to an aspect, features of the present disclosure are practiced in conjunction with a graphics library, other operating systems, or any other application program, and is not limited to any particular application or system. This basic configuration is illustrated by those components within a dashed line 710. According to an aspect, computing device 700 includes one or more input device(s) 712 (keyboard, mouse, pen, touch input device, etc.) and one or more output device(s) 714 (e.g., display, speakers, a printer, etc.).

According to an aspect, the computing device 700 includes additional data storage devices 716/718 (removable and/or non-removable) such as, for example, magnetic disks, optical disks, or tape. According to an aspect, computing device 700 comprises a communication connection 720 that allows device 700 to communicate with other computing devices 722, such as over a network in a distributed computing environment, for example, an intranet or the Internet. Communication connection 720 is one example of communication media.

According to an aspect, program modules, such as the smart mapping engine 110, include routines, programs, components, data structures, and other types of structures that perform particular tasks or that implement particular abstract data types. Moreover, according to an aspect, features of the present disclosure are practiced with other computer system configurations, such as hand-held devices, multiprocessor systems, microprocessor-based or programmable user electronics, minicomputers, mainframe computers, and the like. According to an aspect, features of the present disclosure are practiced in distributed computing environments where tasks are performed by remote processing devices that are linked through a communications network. In a distributed computing environment, program modules are located in both local and remote memory storage devices.

Furthermore, according to an aspect, features of the present disclosure are practiced in an electrical circuit comprising discrete electronic elements, packaged or integrated electronic chips containing logic gates, a circuit utilizing a microprocessor, or on a single chip containing electronic elements or microprocessors. According to an aspect, features of the disclosure are practiced using other technologies capable of performing logical operations such as, for example, AND, OR, and NOT, including but not limited to mechanical, optical, fluidic, and quantum technologies. According to an aspect, features of the disclosure are practiced within a general purpose computer or in any other circuits or systems.

Aspects of the present disclosure, for example, are implemented as a computer process (method), a computing system, or as an article of manufacture, such as a computer program product or computer readable media. The computer program product may be a computer storage media readable by a computer system and encoding a computer program of instructions for executing a computer process. Accordingly, the aspects of the present disclosure may be embodied in hardware and/or in software (including firmware, resident software, micro-code, etc.). In other words, aspects of the present disclosure may take the form of a computer program product on a computer-usable or computer-readable storage medium having computer-usable or computer-readable program code embodied in the medium for use by or in connection with an instruction execution system.

Although aspects of the present disclosure have been described as being associated with data stored in memory and other storage mediums, data is also storable on or readable from other types of computer-readable media, such as secondary storage devices, like hard disks, floppy disks, or a CD-ROM, or other forms of RAM or ROM. The term computer-readable storage medium refers only to devices and articles of manufacture that store data and/or computer-executable instructions readable by a computing device. Computer-readable storage media do not include communications media.

According to an aspect, features of the present disclosure are utilized in various distributed computing environments where tasks are performed by remote processing devices that are linked through a communications network.

The description and illustration of one or more aspects provided in this application are intended to provide a complete thorough and complete disclosure the full scope of the subject matter to those skilled in the art and not intended to limit or restrict the scope of the invention as claimed in any way. The aspects, examples, and details provided in this application are considered sufficient to convey possession and enable those skilled in the art to practice the best mode of claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, example, or detail provided in this application unless expressly stated herein. Regardless of whether shown or described collectively or separately, the various features (both structural and methodological) are intended to be selectively included or omitted to produce an aspect with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A method for improving efficiency in a smart mapping system determining an intended recipient of an information request item, comprising:

receiving an information request dataset associated with an information request item from an information requestor requesting information associated with a user;

parsing the information request dataset to identify one or more data elements comprising information source data, user data, and information requestor data;

performing a search of a mapping database for one or more mapping property values that include a name mapping property value, an abbreviation mapping property value, and a state mapping property value associated with an information source candidate matching the one or more data elements comprising the information source data, the user data, and the information requestor data;

in response to an exact match between the name mapping property value, the abbreviation mapping property value, and the state mapping property value associated with the information source candidate and the one or more data elements comprising the information source data, the user data, and the information requestor data, determining that the information source candidate is the intended recipient of the information request item;

in response to not identifying an exact match between the name mapping property value, the abbreviation mapping property value, and the state mapping property value associated with the information source candidate and the one or more data elements comprising the information source data, the user data, and the information requestor data, determining the intended recipient by:

performing a search for one or more information source candidates with at least one of the name mapping property value, the abbreviation mapping property value, and the state mapping property value partially matching at least one data element;

calculating a match agreement score for the one or more information source candidates with at least one of the name mapping property value, the abbreviation mapping property value, and the state mapping property value partially matching the at least one data element; and determining one of the one or more information source candidates with at least one of the name mapping property value, the abbreviation mapping property value, and the state mapping property value partially matching the at least one data element is the intended recipient of the information request item based at least in part on the match agreement score; and
transmitting the information request item to the determined intended recipient.

2. The method of claim 1, wherein calculating a match agreement score for the one or more information source candidates with at least one of the name mapping property value, the abbreviation mapping property value, and the state mapping property value partially matching the at least one data element comprises calculating a percentage of matching characters between the at least one of the name mapping property value, the abbreviation mapping property value, and the state mapping property value and the at least one data element.

3. The method of claim 1, wherein parsing the information request dataset to identify one or more data elements comprises extracting and parsing information source data elements, user data elements, and information requestor data elements.

4. The method of claim 3, further comprising:
determining that an information source candidate is indeterminable based at least in part on the information source data elements in the information request dataset not distinguishing a first information source candidate from a second information source candidate;
identifying one or more location data elements associated with the information request dataset;
determining at least one probable location associated with the information source candidate based at least in part on the one or more location data elements; and
when more than one probable location associated with the information source candidate is determined:
calculating a confidence score for each of the more than one probable location based at least in part on a weight associated with the location data element used to determine the probable location and on consistency of probable location results; and
selecting a best probable location based on the confidence score; and
performing a search for one or more information source candidates with a mapping property value matching the best probable location.

5. The method of claim 4, wherein determining at least one probable location associated with the information source candidate based at least in part on the one or more location data elements comprises determining at least one probable location associated with the information source candidate based on at least one of:
the user's demographic information;
the user's employer location information;
a location of the information requestor; and
a location of another information source associated with the user.

6. The method of claim 1, further comprising:
in response to an exact match between one or more mapping property values associated with the information source candidate and the one or more data elements, transmitting a notification to the information requestor that the exact match is the intended recipient of the information request item.

7. The method of claim 1, further comprising:
in response to identifying one or more information source candidates with at least one mapping property value partially matching at least one data element, transmitting a notification to the information requestor of the one or more information source candidates.

8. The method of claim 7, further comprising:
receiving input from the information requestor, wherein the input includes a selection of one of the one or more information source candidates.

9. The method of claim 1, further comprising storing a record of match data associated with the determined intended recipient.

10. The method of claim 9, further comprising:
receiving an information response item from the determined intended recipient;
determining, based on the information response item from the determined intended recipient, whether the determined intended recipient is an accurate match; and
when a positive determination is made, storing a record of match accuracy data.

11. The method of claim 10, further comprising:
when a determination is made that the determined intended recipient is not an accurate match:
storing a record of match accuracy data;
determining a second intended recipient of the information request item based at least in part on the match agreement score;
transmitting the information request item to the second determined intended recipient;
receiving an information response item from the determined intended recipient;
determining whether the determined intended recipient is an accurate match; and
when a positive determination is made, storing a record of match accuracy data.

12. The method of claim 11, further comprising:
analyzing the match data and match accuracy data to identify a trend; and
when a trend is identified, refining one or more mapping property values associated with an information source candidate.

13. A system having improved functionality for determining an intended recipient of an information request item, comprising:
a hardware processor coupled to a non-transitory medium storing instructions that, when executed by the hardware processor, implement a mapping engine to receive an information request dataset associated with an information request item from an information requestor requesting information associated with a user, wherein the mapping engine comprises:
a data element extractor to parse the information request dataset to identify one or more data elements, the one or more data elements comprising information source data elements, user data elements, and information requestor data elements;
a deterministic matcher to:
perform a search of a mapping database for one or more mapping property values that include a name mapping property value, an abbreviation mapping property value, and a state mapping property value associated with an information source candidate matching the one or more data elements comprising the information source data elements, the user data elements, and the information requestor data elements; and
in response to an exact match between the name mapping property value, the abbreviation mapping property value, and the state mapping property value associated with the information source candidate and the one or more data elements comprising the information source data elements, the user data elements, and the information requestor data elements, determine that the information source candidate is the intended recipient of the information request item;

a probabilistic matcher, wherein in response to not identifying an exact match between the name mapping property value, the abbreviation mapping property value, and the state mapping property value associated with the information source candidate and the one or more data elements comprising the information source data elements, the user data elements, and the information requestor data elements, to determine the intended recipient:

perform a search for one or more information source candidates with at least one of the name mapping property value, the abbreviation mapping property value, and the state mapping property value partially matching at least one data element;

calculate a match agreement score for the one or more information source candidates with at least one of the name mapping property value, the abbreviation mapping property value, and the state mapping property value partially matching the at least one data element; and determine one of the one or more information source candidates with at least one of the name mapping property value, the abbreviation mapping property value, and the state mapping property value partially matching the at least one data element is the intended recipient of the information request item based at least in part on the match agreement score; and an output engine to transmit the information request item to the determined intended recipient.

14. The system of claim 13, wherein the probabilistic matcher is further operative to:

determine that an information source candidate is indeterminable based at least in part on the information source data elements in the information request dataset not distinguishing a first information source candidate from a second information source candidate;

identify one or more location data elements associated with the information request dataset;

determine at least one probable location associated with the information source candidate based at least in part on the one or more location data elements; and when more than one probable location associated with the information source candidate is determined:

calculate a confidence score for each of the more than one probable locations based at least in part on a weight associated with the location data element used to determine the probable location and on consistency of probable location results; and select a best probable location based on the confidence score; and perform a search for one or more information source candidates with a mapping property value matching the best probable location.

15. The system of claim 14, wherein the probabilistic matcher is operative to determine at least one probable location associated with the information source candidate based on at least one of:

the user's demographic information;
the user's employer location information;
a location of the information requestor; and
a location of another information source associated with the user.

16. The system of claim 15, wherein when a determination is made that the determined intended recipient is not an accurate match:

the probabilistic matcher is further operative to determine a second intended recipient of the information request item based at least in part on the match agreement score;

the output engine is further operative to transmit the information request item to the second determined intended recipient; and a match analyzer to:
receive an information response item from the determined intended recipient;
determine, based on the information response item from the determined intended recipient, whether the determined intended recipient is an accurate match; and
when a positive determination is made, store a record of match accuracy data.

17. The system of claim 13, wherein the mapping engine further comprises a notification engine to:

in response to an exact match between one or more mapping property values associated with the information source candidate and the one or more data elements, transmit a notification to the information requestor that the exact match is the intended recipient of the information request item; and in response to identifying one or more information source candidates with at least one mapping property value partially matching at least one data element, transmit a notification to the information requestor of the one or more information source candidates.

18. The system of claim 13, wherein the mapping engine further comprises a match analyzer to:

receive an information response item from the determined intended recipient;
determine, based on the information response item from the determined intended recipient, whether the determined intended recipient is an accurate match;
store a record of match accuracy data;
analyze match data and match accuracy data to identify a trend; and
when a trend is identified, refine one or more mapping property values associated with an information source candidate.

19. A non-transitory storage medium that includes instructions that, when executed by a hardware processor, improve efficiency in a smart mapping system determining an intended recipient of an information request item by:

receiving an information request dataset associated with an information request item from an information requestor requesting information associated with a user;

parsing the information request dataset to identify one or more data elements comprising information source data, user data, and information requestor data;

performing a search of a mapping database for one or more mapping property values that include a name mapping property value, an abbreviation mapping property value, and a state mapping property value associated with an information source candidate matching the one or more data elements comprising the information source data, the user data, and the information requestor data;

in response to an exact match between the name mapping property value, the abbreviation mapping property value, and the state mapping property value associated with the information source candidate and the one or more data elements comprising the information source data, the user data, and the information requestor data, determining that the information source candidate is the intended recipient of the information request item;

in response to not identifying an exact match between the name mapping property value, the abbreviation mapping property value, and the state mapping property value associated with the information source candidate and the one or more data elements comprising the information source data, the user data, and the information requestor data, determining the intended recipient by:

performing a search for one or more information source candidates with at least one of the name mapping property value, the abbreviation mapping property value, and the state mapping property value partially matching at least one data element;

calculating a match agreement score for the one or more information source candidates with at least one of the name mapping property value, the abbreviation mapping property value, and the state mapping property value partially matching the at least one data element; and determining one of the one or more information source candidates with at least one of the name mapping property value, the abbreviation mapping property value, and the state mapping property value partially matching the at least one data element is the intended recipient of the information request item based at least in part on the match agreement score; and transmitting the information request item to the determined intended recipient.

20. The non-transitory storage medium of claim 19, wherein when more than one probable location associated with the information source candidate exists:

calculating a confidence score for each probable location based at least in part on a weight associated with the location data element used to determine the probable location; and selecting a best probable location based on the confidence score; and performing a search for one or more information source candidates with a mapping property value matching the best probable location.

* * * * *